(12) United States Patent
Hattori et al.

(10) Patent No.: US 12,537,904 B2
(45) Date of Patent: Jan. 27, 2026

(54) INFORMATION PROCESSING SYSTEM, METHOD, AND NON-TRANSITORY COMPUTER-EXECUTABLE MEDIUM

(71) Applicant: PFU LIMITED, Ishikawa (JP)

(72) Inventors: Katsuhiro Hattori, Ishikawa (JP); Akira Takano, Ishikawa (JP); Kunihiko Oumi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 218 days.

(21) Appl. No.: 18/415,469

(22) Filed: Jan. 17, 2024

(65) Prior Publication Data

US 2024/0244154 A1 Jul. 18, 2024

(30) Foreign Application Priority Data

Jan. 18, 2023 (JP) ................. 2023-005597

(51) Int. Cl.
*H04N 1/04* (2006.01)
*G06T 7/00* (2017.01)
*H04N 1/00* (2006.01)
*H04N 1/60* (2006.01)

(52) U.S. Cl.
CPC ......... *H04N 1/6052* (2013.01); *G06T 7/0004* (2013.01); *H04N 1/00806* (2013.01); *G06T 2207/10024* (2013.01); *G06T 2207/30144* (2013.01); *G06T 2207/30168* (2013.01)

(58) Field of Classification Search
None
See application file for complete search history.

(56) References Cited

U.S. PATENT DOCUMENTS

| 6,115,104 A | 9/2000 | Nakatsuka |
| 2019/0297226 A1 | 9/2019 | Ohkubo et al. |
| 2024/0257547 A1* | 8/2024 | Hattori ................ G06V 30/162 |

FOREIGN PATENT DOCUMENTS

| JP | 11-150656 A | 6/1999 |
| JP | 2018-098630 A | 6/2018 |

* cited by examiner

Primary Examiner — Cheukfan Lee
(74) Attorney, Agent, or Firm — Rimon P.C.

(57) ABSTRACT

An information processing system includes circuitry to determine a recommended setting by performing a comparison analysis using one or a plurality of first images and one or a plurality of second images. The recommended setting is a setting different from a setting used in obtaining the one or the plurality of second images by the second image reading apparatus or the second image processor. The recommended setting is a setting causing one or a plurality of third images to be closer to the one or the plurality of first images than the one or the plurality of second images. The one or the plurality of third images are obtained from the single-sheet original document or the multiple-sheet original document by the second image reading apparatus and by the second image processor to which the recommended setting is applied.

18 Claims, 16 Drawing Sheets

<COLOR CORRESPONDENCE>

OUTPUT IMAGE BEFORE REPLACEMENT

OUTPUT IMAGE AFTER REPLACEMENT

OUTPUT IMAGE BY SCANNER B
(IMAGE ON WHICH THIRD
PROCESS HAS BEEN PERFORMED)

STANDARD DEVIATION
OF GRADATION: LARGE

OUTPUT IMAGE BY SCANNER A
(FIRST IMAGE)

STANDARD DEVIATION
OF GRADATION: SMALL

FIG. 7

Create Automatic Profile

A profile that outputs the same image as the previous scanner is to be created.
Please register image data of the same original document.

New scanner

Order Confirmation

YYYY Company   No:1111
              Billing date:
              November 11, 2022
                          ZZZZ Corporation Subject name: XXXXXXXX Please be advised that your payment is listed below.

Total amount: 79,600 JPY (including tax)

| Description | Quantity | Unit price | Amount |
|---|---|---|---|
| AAAAAAAA | 1 | 10,000 | 10,000 |
| BBBBBBBB | 2 | 20,000 | 40,000 |
| | | Subtotal | ¥50,000 |

(1/4)

Previous scanner

Order Confirmation

YYYY Company   No:1111
              Billing date:
              November 11, 2022
                          ZZZZ Corporation Subject name: XXXXXXXX Please be advised that your payment is listed below.

Total amount: 79,600 JPY (including tax)

| Description | Quantity | Unit price | Amount |
|---|---|---|---|
| AAAAAAAA | 1 | 10,000 | 10,000 |
| BBBBBBBB | 2 | 20,000 | 40,000 |
| | | Subtotal | ¥50,000 |

(1/4)

Start analysis            Cancel

FIG. 9

Create Automatic Profile

Create a profile with the following settings.

- image type          Color      [Change]
- Resolution          300dpi     [Change]
- Paper size          A4         [Change]
- Punch hole removal  OFF        [Change]
...

Image that can be output with this profile

Order Confirmation

YYYY Company          No:1111
                      Billing date:
                      November 11, 2022
                      ZZZZ Corporation Subject name: XXXXXXXX Please be advised that your payment is listed below.

Total amount: 79,600 JPY (including tax)

| Description | Quantity | Unit price | Amount |
|---|---|---|---|
| AAAAAAAA | 1 | 10,000 | 10,000 |
| BBBBBBBB | 2 | 20,000 | 40,000 |
| | | Subtotal | ¥50,000 |

(1/4) ▲▼

Target image

Order Confirmation

YYYY Company          No:1111
                      Billing date:
                      November 11, 2022
                      ZZZZ Corporation Subject name: XXXXXXXX Please be advised that your payment is listed below.

Total amount: 79,600 JPY (including tax)

| Description | Quantity | Unit price | Amount |
|---|---|---|---|
| AAAAAAAA | 1 | 10,000 | 10,000 |
| BBBBBBBB | 2 | 20,000 | 40,000 |
| | | Subtotal | ¥50,000 |

(1/4) ▲▼

[Register Profile]   [Cancel]

FIG. 17A
OUTPUT IMAGE
BEFORE REPLACEMENT
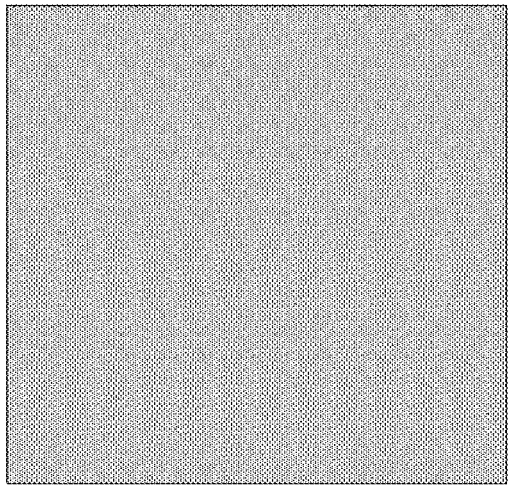
FIG. 17B
OUTPUT IMAGE
AFTER REPLACEMENT
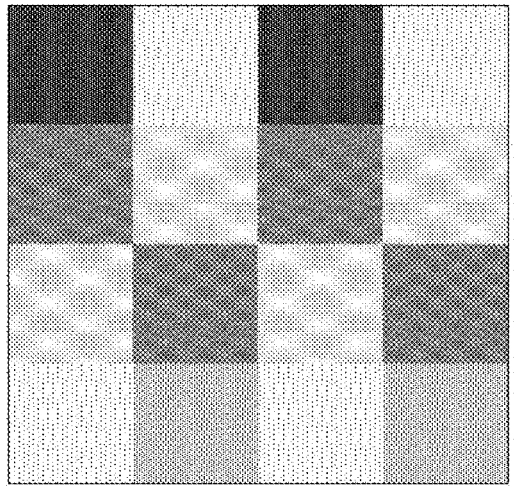
FIG. 17C
<COLOR CORRESPONDENCE>
OUTPUT IMAGE
BEFORE REPLACEMENT
OUTPUT IMAGE
AFTER REPLACEMENT
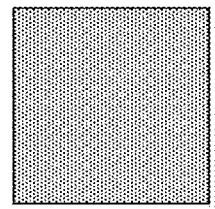  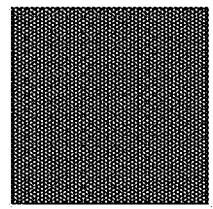
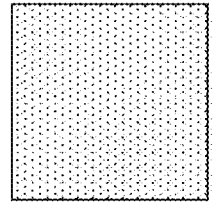

INFORMATION PROCESSING SYSTEM, METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2023-005597, filed on Jan. 18, 2023, in the Japan Patent Office, the entire disclosure of which is hereby incorporated by reference herein.

BACKGROUND

Technical Field

Embodiments of the present disclosure relate to an information processing system, a method, and a non-transitory computer-executable medium.

Related Art

An apparatus that includes an image reading unit that acquires read image data of target printed material is known in the art. The apparatus further includes a first color conversion unit that performs color conversion using a first color conversion table representing a correspondence between a signal value of a first color space obtained from the image reading unit and a chromaticity value of a second color space, which is a device-independent color space. The apparatus further includes an image correlation unit that performs correlation of a positional relation between the read image data or the read chromaticity value image data converted into a chromaticity value and original document image data. The apparatus further includes a color conversion table creation unit that creates a second color conversion table representing a multi-dimensional correspondence between a third color space of the original document image data and the second color space on the basis of the correspondence between the document image data and a chromaticity value of a read image. The apparatus causes the image reading unit to read first printed material that is printed by a printing apparatus on the basis of first image data, and thus creates an output device color conversion table.

Further, an apparatus that includes an image processing control information obtaining unit, an image processing parameter inference determining unit, and an image processing unit is known in the art. The image processing control information obtaining unit obtains input characteristic information of an image input unit to be used and output characteristic information of an image output unit. The image processing control information obtaining unit analyzes the state of an image (i.e., image to be processed) that is input from the image input unit to obtain image analysis information. The image processing control information obtaining unit obtains an operator's request regarding the image that is output from the image output unit as intention information. The image processing parameter inference determining unit infers and determines an image processing parameter for predetermined image processing on the basis of the obtained image processing control information. The image processing unit performs image processing according to the image processing parameter determined by inference and outputs the result of the image processing as image data to the image output unit. The image output unit outputs the image data that is output from the image processing unit as an image.

SUMMARY

According to an embodiment of the present disclosure, an information processing system includes circuitry. The circuitry acquires one or a plurality of first images, which are one or a plurality of images obtained by performing image processing by a first image processor on one or a plurality of read images generated by reading a single-sheet original document or a multiple-sheet original document by a first image reading apparatus. The circuitry acquires one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus. The circuitry determines a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

According to an embodiment of the present disclosure, a method includes acquiring one or a plurality of first images, which are one or a plurality of images obtained by performing image processing by a first image processor on one or a plurality of read images generated by reading a single-sheet original document or a multiple-sheet original document by a first image reading apparatus. The method includes acquiring one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus. The method includes determining a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

According to an embodiment of the present disclosure, a non-transitory computer-executable medium storing a plurality of instructions which, when executed by a processor, causes the processor to perform a method. The method includes acquiring one or a plurality of first images, which are one or a plurality of images obtained by performing image processing by a first image processor on one or a plurality of read images generated by reading a single-sheet original document or a multiple-sheet original document by a first image reading apparatus. The method includes acquiring one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus. The method includes determining a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a diagram illustrating the recommended setting generation screen displayed at the start of analysis, according to an embodiment of the present disclosure;

FIG. 9 is a diagram illustrating the recommended setting generation screen displayed at presenting a recommended setting, according to an embodiment of the present disclosure;

FIG. 17A to FIG. 17C are diagrams each illustrating the correspondence between the color of an image output by an image reading apparatus to be replaced and the color of an image output by another image reading apparatus as a replacement.

Figure 1:
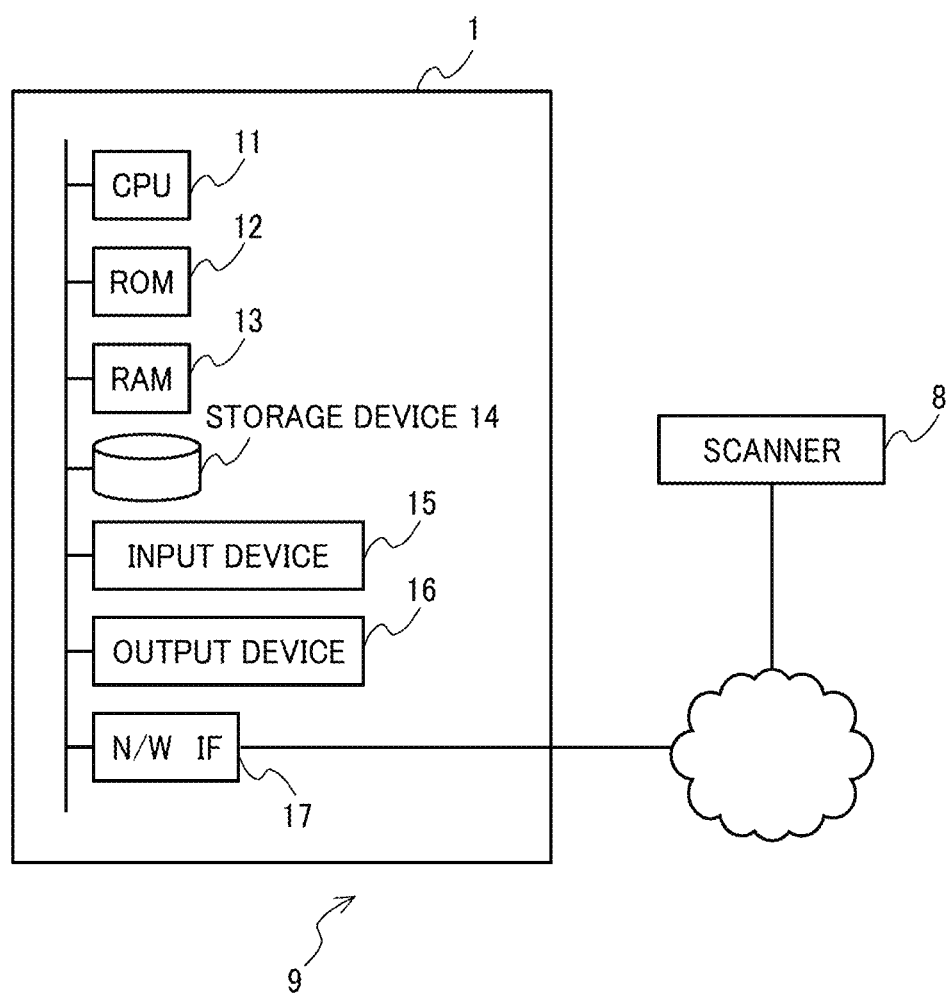
FIG. 1 is a schematic diagram illustrating a configuration of a system, according to Embodiment 1 of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The present disclosure can be understood as an information processing apparatus, a system, a method executed by a computer, or a program executed by a computer. Further, the present disclosure can also be understood as a storage medium that stores such a program and that can be read by, for example, a computer, other apparatus, or machines. The storage medium that can be read by, for example, the computer refers to a storage medium that can store information such as data or programs by electrical, magnetic, optical, mechanical, or chemical action, and that can be read by, for example, a computer.

An information processing system, an information processing apparatus, a method, and a program according to embodiments of the present disclosure are described with reference to the drawings. Embodiments described below are illustrative, and do not limit the information processing system, the information processing apparatus, the method, and the program according to the present disclosure to the specific configurations described below. In the implementation, specific configurations may be adopted appropriately according to the mode of implementation, and various improvements and modifications may be made.

Embodiment 1

In the present embodiment, an embodiment of a case where an information processing system, an information processing apparatus, a method, and a program according to the present disclosure are implemented in a system for, when a scanner is to be replaced to another scanner, estimating settings according to which the other scanner obtains an image (image output result) equivalent to an image (image output result) obtained by the scanner is described. However, the information processing system, the information processing apparatus, the method, and the program according to the present disclosure can be widely used for a technology for estimating settings for obtaining an image (image output result) equivalent to an image (image output result) obtained by another scanner, and the application target of the present disclosure is not limited to what is described in the embodiments.

As known in the art, a scanner is sometimes to be replaced with a new scanner due to, for example, aging or failure. In such a case, a user often wants to replace the scanner with as little effort as possible. Further, many users desire that an image equivalent to an output image by the scanner to be replaced can be obtained with the new scanner.

To address such needs, some technologies to match the color tone output by one image forming apparatus to the color tone of another image forming apparatus are known in the art. However, for example, when the function of adjusting the brightness of the whole area of an image according to the brightness of the whole area of an original document is used in an image reading apparatus to be replaced, the correspondence between the colors of output images before and after the replacement created for a certain original document cannot be applied to other documents. Further, for example, a case where a smoothing process is performed in the image reading apparatus to be replaced is assumed. When smoothing is performed, similar colors in a certain range is output as if the colors are one color. As a result, in a case where the smoothing process is performed in the image reading apparatus to be replaced but the smoothing process is not performed in the new image reading apparatus, when the correspondence between the colors of the two output images is obtained, the obtained correspondence is a correspondence between a plurality of colors and one color.

FIG. 17A to FIG. 17C are diagrams each illustrating the correspondence between the color of an image output by an image reading apparatus to be replaced and the color of an image output by another image reading apparatus as a replacement. In the following description, the image output by the image reading apparatus to be replaced may be referred to as an "output image before replacement." Further, in the following description, the image output by another image reading apparatus as a replacement may be referred to as an "output image after replacement." FIG. 17A and FIG. 17B illustrate an output image before replacement and an output image after replacement for the same area of the same original document. A smoothing process is performed in the image reading apparatus to be replaced. The output image before replacement illustrated in FIG. 17A is an output image on which the smoothing process has been performed. By contrast, no smoothing process is performed in the image reading apparatus as a replacement. The output image after replacement illustrated in FIG. 17B is an output image on which the smoothing process has not been performed. In this case, when the correspondence between colors at corresponding positions between the images is obtained, as illustrated in FIG. 17C, one color of the output image before replacement corresponds to multiple colors of the output image after replacement. In other words, a correspondence between multiple colors and one color is obtained. In this case, inconsistency occurs in the correspondence of colors in other areas (pixels) or other original documents on which smoothing is not performed.

In view of the above, when matching colors, it is sometimes preferable to match image processing settings such as whether to perform a smoothing process, in addition to adjusting color tones based on a simple color correspondence. In other words, it is preferable to create the color correspondence for a case where a smoothing process is performed by the image reading apparatus to be replaced and the image reading apparatus as a replacement and for a case where no smoothing process is performed by the image reading apparatus to be replaced and the image reading apparatus as a replacement. As described above, to make an image acquired by the image reading apparatus as a replacement be matched with an image acquired by the image reading apparatus to be replaced, it is preferable to match image processing settings and image reading settings with the settings of the image reading apparatus to be replaced. In other words, it is preferable to imitate the settings of the image reading apparatus to be replaced.

However, when the function names (or item names) or the item values for the same setting item are different between the apparatuses, or when the default settings are different between the apparatuses, a user may have difficulty in configuring settings for acquiring an image equivalent to the output image before replacement. In other words, there is a drawback that it takes efforts to estimate (specify) settings for obtaining an image desired by a user.

In view of such circumstances, in the information processing system, the information processing apparatus, the method, and the program according to the present embodiment, comparison analysis using a first image acquired using a scanner to be replaced and a second image acquired using another scanner as a replacement for the same original document. Further, a recommended setting is determined so that an image obtained using the other scanner as the replacement is closer to the first image obtained using the scanner to be replaced. Thus, a setting according to which a user's desired image is acquired is specified in a simple manner. This allows a user to smoothly perform a replacement without paying attention to settings such as image reading settings and image processing settings relating to the image reading apparatus to be replaced.

System Configuration

FIG. 1 is a schematic diagram illustrating a configuration of a system 9, according to the present embodiment. The system 9 according to the present embodiment includes a scanner 8 and an information processing apparatus 1 that are communicably connected to each other via a network or other communication means.

The information processing apparatus 1 is a computer including a central processing unit (CPU) 11, a read-only memory (ROM) 12, a random-access memory (RAM) 13, a storage device 14 such as an electrically erasable programmable read-only memory (EEPROM) and a hard disk drive (HDD), an input device 15 such as a keyboard, a mouse, and a touch panel, an output device 16 such as a display, and a communication unit 17 such as a network interface card (NIC). Regarding the specific hardware configuration of the information processing apparatus 1, any component may be omitted, replaced, or added as appropriate according to a mode of implementation. Further, the information processing apparatus 1 is not limited to a single apparatus. The information processing apparatus 1 may be implemented by a plurality of apparatuses using, for example, a so-called cloud or distributed computing technology.

The scanner 8 is an apparatus (an image reading apparatus) that acquires an image (image data) by imaging, for example, an original document, a business card, a receipt, a photograph, or an illustration that is placed by a user. The scanner 8 is a scanner as a replacement (i.e., a scanner B) in the present embodiment. In the present embodiment, a case where a scanner is used as the image reading apparatus is described. However, the image reading apparatus is not limited to a scanner. For example, a multifunction peripheral may be used as the image reading apparatus. The scanner 8 according to the present embodiment has a function of transmitting image data obtained by imaging to the information processing apparatus 1 through a network. The scanner 8 may further include a user interface such as a touch panel display and a keyboard that enables an input/output of characters and a selection of a desired item. The scanner 8 may further include a web browsing function and a server function. Communication means and the hardware configuration of the scanner that can adopt a method according to the present embodiment are not limited to what is described for an illustrative purpose in the present embodiment.

Figure 2:
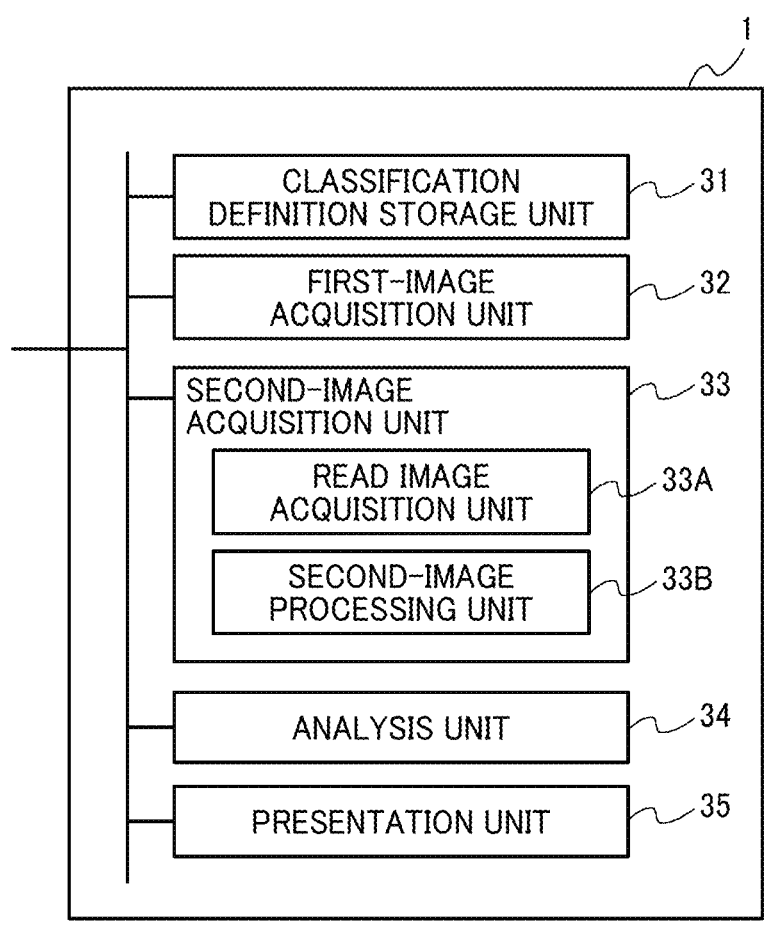
FIG. 2 is a schematic diagram illustrating a functional configuration of an information processing apparatus, according to Embodiment 1 of the present disclosure.

FIG. 2 is a schematic diagram illustrating a functional configuration of the information processing apparatus 1, according to the present embodiment. The CPU 11 executes a program that is loaded onto the RAM 13 from the storage device 14 and controls the hardware components of the information processing apparatus 1 according to the program. Thus, the information processing apparatus 1 functions as an apparatus including a classification definition storage unit 31, a first-image acquisition unit 32, a second-image acquisition unit 33, an analysis unit 34, and a presentation unit 35. The second-image acquisition unit 33 includes a read image acquisition unit 33A and a second-image processing unit 33B. In the present embodiment and other embodiments described below, the functions of the information processing apparatus 1 are executed by the CPU 11, which is a general-purpose processor. Alternatively, a part or all of these functions may be executed by one or a plurality of dedicated processors.

The classification definition storage unit 31 stores a classification definition that classifies multiple setting items into N groups from a first group to an N-th group, where N is a natural number of 2 or more. The multiple setting items include image reading setting items and/or image processing setting items. The N groups include the first group and an n-th group, where n is a natural number of 2 or more and N or less. The first group is a group to which one or more setting items belong whose recommended settings are determined without being affected by setting content of another setting item. In other words, the first group is an independent group that is not affected by another setting. The n-th group is a group to which one or more setting items belong whose recommended settings are determined as being affected by the setting content of the setting item belonging to at least the (n−1)-th group. In other words, the n-th group is a dependent group that is affected by another setting content.

Examples of the independent group include setting items relating to at least one of a color mode, a resolution, an automatic cropping (function), a paper size, a scan side, a blank page deletion (function), a front and back combination (function), and a vertical split (function). In other words, the independent group includes setting items of basic parameters. Further, the dependent group includes a setting item relating to at least one of a punch hole removal (function), an orientation correction (function), a brightness adjustment (function), an automatic brightness correction (function), a smoothing (function), a background pattern removal (function), a noise removal (function), and color.

In the present embodiment, the dependent group includes a first dependent group that is affected by the setting content of the setting item belonging to the independent group, a second dependent group that is affected by the setting content of the setting item belonging to the first dependent group, and a third dependent group that is affected by the setting content of the setting items belonging to the second dependent group. In the present embodiment, examples of the setting items belonging to the first dependent group include setting items relating to a punch hole removal function and an orientation correction function. In the present embodiment, examples of the setting items belonging to the second dependent group include setting items relating to a brightness adjustment function, an automatic brightness correction function, a background pattern removal function, and a noise removal function. In the present embodiment, examples of the setting items belonging to the third dependent group include setting items relating to a smoothing function. In the present embodiment, the dependent group includes three groups. However, this is merely illustrative. The number of the dependent groups may be any desired number of one or more. Further, the setting items are not limited to the items described above, and any desired items may be used. Furthermore, the setting items belonging to each of the groups are not limited to the above-described items, and can be set (selected) by a user as desired.

The first-image acquisition unit 32 acquires one or a plurality of first images which are one or a plurality of images obtained by performing image processing by a first image processor on one or a plurality of read images generated by reading a single-sheet original document or a multiple-sheet original document by a first image reader. In the following description, the one or the plurality of first images acquired by the first-image acquisition unit 32 may be referred to as a "first image group." The first image group may include only one first image. In the present embodiment, the read image refers to an image on which no image processing is performed (e.g., a raw image). In the present embodiment, the first-image acquisition unit 32 acquires the first image group obtained (output) by reading a single-sheet original document or a multiple-sheet original document by a scanner A, which is a scanner to be replaced, and then performing image processing by a scanner driver of the scanner A. The scanner A serves as the first image reader. The scanner driver of the scanner A serves as the first image processor. The first image reader and the first image processor are omitted in the drawing to simplify the drawing. The scanner to be replaced is a scanner manufactured by other company, and the scanner as a replacement is a scanner manufactured in-house. However, this is merely illustrative. The scanner to be replaced and the scanner as a replacement are not limited to scanners manufactured by different companies (manufacturers). Further, the first image reader (the scanner A) is not limited to the scanner to be replaced and a second image reader (the scanner B) are not limited to the scanner as a replacement. The first image reader (the scanner A) and the second image reader (the scanner B) are any desired scanners, provided that they are different scanners. The different scanners include two scanners of the same model.

An original document to be used may be any desired document, and may be, for example, an original document used when the scanner A is operated (e.g., a customer operation document). Further, the number of sheets of the original document to be used may be one or multiple. Furthermore, the image processing performed by the first image processor (i.e., the first image processing) may be any desired processing, and may be image processing according to image processing settings used when the scanner A is operated. Thus, the first-image acquisition unit 32 acquires scanned images obtained using the scanner to be replaced (i.e., the first image group).

In the present embodiment, the term "acquire" or "acquisition" refers to acquiring information by various methods, such as acquiring information from a connected apparatus such as the scanner A or a scanner driver (information processing apparatus) through, for example, a network, or reading information stored in the information processing apparatus 1 or another storage apparatus. In the present embodiment, the first-image acquisition unit 32 acquires the first image group by reading (loading) the first image group from the storage device 14. Alternatively, the first-image acquisition unit 32 may acquire the first image group from the first image processor through, for example, a network. Further, when not only the scanner B but also the scanner A is connected to the information processing apparatus 1 (i.e., when the information processing apparatus 1 includes the driver of the scanner A (i.e., the first image processor), the first-image acquisition unit 32 may control the scanner A to capture an image of a placed original document by the scanner A, and thus acquires a second image.

The second-image acquisition unit 33 acquires one or a plurality of second images, which are one or a plurality of read images generated by reading a single-sheet original document or a multiple-sheet original document by the second image reader or one or a plurality of images obtained by performing image processing by a second image processor on one or a plurality of read images generated by reading a single-sheet original document or a multiple-sheet original document by the second image reader. In the following description, the one or the plurality of second images acquired by the second-image acquisition unit 33 may be referred to as a "second image group." The second image group may include only one second image. It is assumed that the first image reader and the second image reader read the same original document, which is a single-sheet original document or a multiple-sheet original document, to acquire the first image group and the second image group corresponding to the same original document. In the present embodiment, the second-image acquisition unit 33 corresponds to a driver of the scanner B (i.e., the second image reader (the scanner 8 in FIG. 2)), which is a scanner as a replacement. The second-image acquisition unit 33 acquires the second image group, which is one or a plurality of read images generated by reading a single-sheet original document of a multiple-sheet original document by the scanner B or one or a plurality of images generated (output) by performing image processing (second image processing) on the one or the plurality of read images.

In the present embodiment, the second-image acquisition unit 33 includes the read image acquisition unit 33A and the second-image processing unit 33B. The read image acquisition unit 33A acquires one or a plurality of read images generated by reading a single-sheet original document or a multiple-sheet original document by the scanner B. The second-image processing unit 33B generates one or a plurality of images on which image processing is performed (i.e., one or a plurality of processed images) by performing image processing (second image processing) on the one or the plurality of read images. Thus, the second-image acquisition unit 33 acquires the one or the plurality of images on which the image processing is performed as the second image group. The second image processing may be any desired processing. The second image processing is, for example, image processing that facilitates determination of a recommended setting in analysis process (comparison analysis) described below. Examples of such image processing include an automatic cropping function "ON." Thus, the second-image acquisition unit 33 acquires scanned images obtained using the scanner B as a replacement (i.e., the second image group).

In the present embodiment, the second-image acquisition unit 33 controls the scanner 8 to capture an image of a placed original document by the scanner 8, and thus acquires the second image group. In the present embodiment, a case where the second-image acquisition unit 33 acquires, as the second image (the second image group), processed images obtained with the color mode being set to "color," the automatic cropping function being set to "ON," and the orientation correction function being set to "automatic" is described for an illustrative purpose. However, the second image is not limited to the processed image. The second image may be a read image. Further, when a dedicated color chart (e.g., a test chart) is used as an original document, scanned data (scanned image) of the color chart may be stored in advance in, for example, the scanner B or the driver of the scanner B. In such a case, the second-image acquisition unit 33 may acquire, as the second image, the second image by reading the scanned image stored in advance without scanning any original document. In this case, the first-image acquisition unit 32 acquires, as the first image, an output image that is obtained by reading the color chart by the first image reader and performing image processing on the read color chart by the first image processor. Further, when the scanner B includes the second image processor that performs image processing on a read image, the second-image acquisition unit 33 may acquire the second image that is the read image or the processed image from the scanner B.

The analysis unit 34 performs comparison analysis using the first image group and the second image group to determine a recommended setting according to which an image (one or a plurality of images) obtained using the scanner B (the second image reader and the second image processor) gets close to an image (one or a plurality of images) obtained using the scanner A (the first image reader and the first image processor). In other words, the analysis unit 34 determines the recommended setting according to which the scanner B obtains an output image equivalent to an output image that is output by the scanner A. The recommended setting according to which the image obtained by the scanner B gets closer to the image obtained by the scanner A is, more specifically, a recommended setting different from a setting used when the second image group is obtained by the second image reader and/or the second image processor, and is a recommended setting according to which one or a plurality of third images (i.e., a third image group) gets closer to the first image group than the second image group. The one or the plurality of third images (i.e., the third image group) is obtained from the single-sheet original document or the multiple-sheet original document by the second image reader and the second image processor to which the recommended setting is applied. The analysis unit 34 determines the recommended setting by performing a comparison analysis between the first image group and the second image group. The second image group includes the second image group on which image processing corresponding to the recommended setting is performed (i.e., the second image group that reflects the recommended setting). The term "being closer" refers to being more similar or to have a greater degree of similarity.

As described above, some of the setting items (e.g., the image reading setting items and/or the image processing setting items) relating to the image reading apparatus are affected by processing according to the setting content of other setting items. For this reason, in the present embodiment, the recommended settings for the multiple setting items relating to the scanner B are determined stepwise. Specifically, when determining a recommended setting of a setting item whose recommended setting is affected by the setting content of another setting item, the analysis unit 34 determines the recommended setting for the other setting item in advance. Further, the analysis unit 34 determines the recommended setting for the to-be affected setting item by performing a comparison analysis between the first image group and the second image group that reflects the determined recommended setting. In other words, assuming that a setting item B is a setting item that is affected by the setting content of another setting item (e.g., a setting item A), in order to determine a recommended setting of the setting item B, a recommended setting of the setting item A is determined in advance, and the analysis process using an image reflecting the determined recommended setting is performed to determine a recommended setting of the setting item B.

Accordingly, in the present embodiment, the analysis unit 34 determines a recommended setting for a setting item belonging to the first group by performing the comparison analysis between the first image group and the second image group. Further, the analysis unit 34 determines a recommended setting for a setting item belonging to the n-th group by performing the comparison analysis between the first image group and the second image reflecting the recommended setting for the setting item belonging to the groups up to the (n−1)-th group. A method of determining a recommended setting stepwise by determining recommended settings in the order of the independent group, the first dependent group, the second dependent group, and the third dependent group is described below.

Independent Group

First, the analysis unit 34 determines a recommended setting for a setting item belonging to the independent group (i.e., a first recommended setting) by performing a comparison analysis between the first image group and the second image group. Settings for a setting item typically include a setting of ON/OFF of a function and a strength setting such as a sensitivity setting or a strong and weak setting for a function that is ON. The analysis unit 34 performs the comparison analysis to determine a setting value (e.g., a recommended value) such as ON/OFF of a function or the strength setting according to which an estimation is made that an image (one or a plurality of images) obtained using the scanner B gets closer to an image (one or a plurality of images) obtained using the scanner A. The method of determining the recommended setting (e.g., the recommended value) includes three methods, which is a Method 1, a Method 2, and a Method 3. According to the Method 1, the recommended setting is determined on the basis of an images relating to the scanner A (i.e., the first image group). According to the Method 2, the recommended setting is determined by comparing a feature of an image relating to the scanner A (i.e., the first image group) with a feature of an image relating to the scanner B (i.e., the second image group or the second image group reflecting a recommended setting). According to the Method 3, the recommended setting is determined by comparing images obtained by performing image processing with setting values (candidate values) varying from one to another.

According to the Method 2, the analysis unit 34 acquires features (features relating to a setting item) of images to be compared in the comparison analysis, and compares the features between the images to be compared to determine the recommended setting. According to the Method 3, the analysis unit 34 performs processing regarding a setting item one or more times with the setting values of the setting item changed from one to another on at least one of images corresponding to the same original document among the images to be compared, and determines the recommended setting for the setting item on the basis of the degree of similarity between the images corresponding to the same original document after the processing is performed. As the rough direction, the Method 1 or the Method 2 is used for setting items relating to setting such as a color mode setting, a resolution setting, and an orientation correction setting. The Method 3 is used for setting items relating to detection such as a blank page deletion function. The Method 2 or the Method 3 is used for setting items relating to processing such as a smoothing function. However, the direction may not be applicable to some setting items. A specific method of determining the recommended settings for the setting items belonging to the independent group is described below.

Color Mode

A setting item relating to a color mode (an image type) (in the following description, referred to simply as a "color mode") is a setting item for setting the color of an image to be output. Examples of the setting value of the color mode include "binary," "gray," and "color." The analysis unit 34 determines a recommended setting by checking the number of colors of the first image on the basis of pixel information of the first image group. For example, pixel information assigned (embedded) to the first image group is acquired, and when the acquired pixel information includes information indicating that the number of image colors is 2 (i.e., 1 bit per pixel), the setting value of the color mode in the scanner A (the first image reader or the first image processor) is identified (estimated) as binary. In this case, the analysis unit 34 determines the recommended setting for the color mode as "binary (or a setting value corresponding to binary)." This determination corresponds to the Method 1.

Resolution

A setting item relating to a resolution (in the following description, referred to simply as a "resolution") is a setting item for setting a resolution of an image to be output. Examples of the setting value of the resolution include "300 dots per inch (dpi)," "600 dpi," "normal," and "fine." When resolution information is embedded in the first image group, the analysis unit 34 determines the recommended setting using the resolution information. For example, when the resolution information indicates that an image resolution is "300 dpi×300 dpi," the setting value of the resolution in the scanner A is identified (estimated) as 300 dpi. Accordingly, the analysis unit 34 determines the recommended setting for the resolution as "300 dpi (or a setting value corresponding to 300 dpi)." This determination corresponds to the Method 1. When the resolution information is not embedded, the resolution of the first image (i.e., the resolution setting in the scanner A) can be estimated on the basis of image size information.

Specifically, the analysis unit 34 acquires the features (i.e., the image sizes) of the images to be compared in the comparison analysis (i.e., the first image group and the second image group), compares the acquired features between images corresponding to the same original document among the images to be compared. The analysis unit 34 determines a recommended setting for the resolution on the basis of the comparison result and the setting status for the resolution in the scanner B (the second image reader or the second image processor). For example, when the setting value of the resolution in the scanner B is 300 dpi and the image size of the second image is 2492×1753 pixels (px), and when the image size of the first image is 4974×3408 px, the analysis unit 34 determines that the ratio of the image size (the number of pixels) (i.e., the number of pixels of the first image/the number of pixels of the second image) is about twice in both the vertical and horizontal directions. Thus, the resolution of the first image, in other words, the setting value of the resolution in the scanner A is estimated as 600 dpi (=300 dpi×2). In this case, the analysis unit 34 determines the recommended setting for the resolution as "600 dpi (or a setting value corresponding to 600 dpi)." This determination corresponds to the Method 2. When the resolution is adjusted by scaling, it is preferable to use a method based on average scaling. For example, when the resolution is reduced by one-half, the average value of the pixel values of 2×2 pixels (four pixels) is used as the changed pixel value.

The recommended setting for the resolution can be determined by the comparison analysis between one first image and one second image corresponding to the same original document. Accordingly, when the first image group includes a plurality of first images and the second image group includes a plurality of second images, recommended settings are determined respectively for pairs of the first image and the second image of the same original document (i.e., the same page). When a difference (mismatch) is present in the recommended settings determined between the pairs (between pages), one of the determined recommended settings is selected and presented to a user. Alternatively, all of the determined recommended settings may be presented to a user. Further, regarding a setting item such as the resolution that can be determined by the comparison analysis using one first image and one second image, a recommended setting may be determined by selecting one first image and one second image corresponding to the same original document (i.e., the same page) from the plurality of first images and the plurality of second images and then performing the comparison analysis between the selected images. A detailed description is given later of the method for determining one recommended setting from the multiple different recommended settings.

Paper Size

A setting item relating to a paper size (in the following description, referred to simply as a "paper size") is a setting item for setting the size of an original document to be scanned. Examples of the setting value of the paper size include "A4," "A5," and "post card." The analysis unit 34 determines a recommended setting for the paper size on the basis of the image size of the first image and the recommended setting for the resolution determined as described above (i.e., the estimated resolution setting in the scanner A). This determination corresponds to the Method 1. For example, it is assumed that the image size of the first image is 1744×2476 px, and the resolution of the first image is estimated as 300 dpi. When the paper size is A5 size (148 mm×210 mm), and when a target resolution is 300 dpi, the required number of pixels (image size) is about 1748×2480 px. Thus, since the image size (1744×2476 px) of the first image whose resolution is 300 dpi is equivalent to the image size of A5 size whose resolution is 300 dpi, the setting value of the paper size in the scanner A is estimated as A5. In this case, the analysis unit 34 determines the recommended setting for the paper size as "A5." This determination corresponds to the Method 2.

Automatic Cropping Function

A setting item related to the automatic cropping function (in the following description, referred to simply as an "automatic cropping function") is a setting item for setting a function of automatically extracting an image area of a document part from a read image by detecting, for example, an edge of the document. Examples of the setting value of the automatic cropping function include "Automatic cropping function ON (enabled)" and "Automatic cropping function OFF (disabled)." The analysis unit 34 performs the following comparison analysis (i.e., comparison between images on which the automatic cropping process has been performed) between images corresponding to the same original document (i.e., the same page) among images to be compared in the comparison analysis. In other words, the analysis unit 34 performs the following comparison analysis between the first image and the second image corresponding to the same original document. The analysis unit 34 typically sets the recommended setting for the automatic cropping function to "ON (enabled)." Since the second image is an image acquired with the automatic cropping function ON, when an image size difference between images corresponding to the same original document (i.e., the first image and the second image) is equal to or greater than a predetermined value (predetermined size) and when an image size difference between the images after the automatic cropping process is performed on the first image is less than a predetermined value (i.e., when the similarity between the images in terms of size is higher than a predetermined similarity), the setting value of the automatic cropping function in the scanner A is estimated as OFF (disabled). In this case, the analysis unit 34 determines the recommended setting for the automatic cropping function as "OFF (disabled)". This determination corresponds to the Method 3. In a case where the second image is an image acquired with the automatic cropping function OFF, when the image size difference between the first image and the second image is equal to or greater than a predetermined value and when the image size difference between the first image and the second image on which the automatic cropping process has been performed is less than a predetermined value, the setting value of the automatic cropping function in the scanner A is estimated as ON (enabled). In this case, the analysis unit 34 determines the recommended setting for the automatic cropping function as "ON (enabled)". This determination corresponds to the Method 3. The above predetermined sizes to be compared with the image size difference may be any desired size.

As an alternative to or in place of the above-described method, the setting value of the automatic cropping function (i.e., whether the automatic cropping is to be performed) in the scanner A may be estimated by performing document edge analysis on the first image. Such estimation corresponds to the Method 1. For example, when a document edge is extracted in the first image as a result of the document edge analysis on the first image (i.e., when a white area or a black area is present around a document area in the first image), it is estimated that the automatic cropping process is not performed in the scanner A, in other words, the automatic cropping function is OFF.

Scan Side, Blank Page Deletion Function

A setting item relating to a scan side (in the following description, referred to simply as a "scan side") is a setting item for setting a scan side when scanning an original document. Examples of the setting value of the scan side include "double-sided" and "one-sided." A setting item relating to a blank page deletion function (in the following description, referred to simply as a "blank page deletion function") is a setting item for configuring a setting for automatically deleting a blank page (e.g., a white sheet or a black sheet) from a read image. Examples of the setting value of the blank page deletion function include "Deletion function ON (enabled)" and "Deletion function OFF (disabled)." The analysis unit 34 determines the recommended settings for the scan side and the blank page deletion function using an original document of multiple sheets (pages). The analysis unit 34 determines whether the number of images of the first image group matches the number of images of the second image group, to determine the recommended settings for the scan side and the blank page deletion function. This determination corresponds to the Method 2. The recommended settings for the scan side and the blank page deletion function are determined on the assumption that the second image group is images obtained by reading an original document of multiple sheets (pages) by double-sided scanning. The setting of the blank page deletion function is estimated on the assumption that a multiple-sheet original document to be used includes a blank page.

The analysis unit 34 compares the number of images of the first image group with the number of images of the second image group to determine the recommended setting for the scan side and the blank page deletion function. In other words, the recommended settings for the scan side and the blank page deletion function are determined by comparing the number of images obtained by reading a multiple-sheet original document by the scanner A with the number of images obtained by reading the multiple-sheet original document by the scanner B. When the result of the comparison between the numbers of images indicates that the numbers of images are the same and the number of images is twice the number of sheets of the original document (for example, when the number of images is obtained by scanning two sheets), the analysis unit 34 estimates that the setting for the scan side in the scanner A is double-sided and the setting for the blank page removal function is OFF. In this case, the analysis unit 34 determines the recommended setting for the scan side as "double-sided" and the recommended setting for the blank page deletion function as "OFF." This determination corresponds to the Method 2. Alternatively, when the number of images of the first image group is twice the number of sheets of the original document, the setting for the scan side in the scanner A is estimated as double-sided and the setting for the blank page deletion function is estimated as OFF. Such estimation corresponds to the Method 1.

By contrast, when the result of the comparison between the numbers of images indicates that there is a difference in the number of images (i.e., the number of images obtained by the scanner A is smaller than the number of images obtained by the scanner B), the blank page deletion process is actually performed on the second image group, and then the comparison between the numbers of images is performed again. When the result of the comparison indicates that the numbers of images are the same, the setting for the scan side in the scanner A is estimated as double-sided and the setting for the blank page deletion function is estimated as ON. By contrast, when the result of the comparison indicates that the numbers of images are different, the setting for the scan side in the scanner A is estimated as one-sided. Such estimation corresponds to the Method 3. When the setting for the scan side is estimated as one-sided, which side of the front side and the back side is read by the scanner A is estimated by performing image comparison by pattern matching. For example, when the scan side is estimated as the front side, the recommended setting for the scan side is determined as "one-sided (front side)." In this case, regarding the setting of the blank page deletion function, for example, when an image corresponding to a blank page is included in the first image group, the setting for the blank page deletion function in the scanner A is estimated as OFF. When the blank page deletion function has a sensitivity (likelihood of being blank) setting value according to which a blank page is detected, the above-described method is performed also on the sensitivity setting value, to identify (estimate) a setting according to which the number of images of the first image group and the number of images of the second image group are same.

Front and Back Combining Function

A setting item relating to the front and back combining function (in the following description, referred to simply as a "front and back combining function") is a setting item for setting a function of automatically combining an image (image data) of the front side of an original document and an image (image data) of the back side of the original document and outputting the combined image as one image data. Examples of the setting value of the front and back combining function include "Combining function ON (enabled)" and "Combining function OFF (disabled)." The analysis unit 34 determines a recommended setting for the front and back combining function using an original document of multiple sheets (pages). The analysis unit 34 compares the number of images and the aspect ratio between images to be compared in the comparison analysis (i.e., between the first image group and the second image group), to determine the recommended setting for the front and back combining function. This determination corresponds to the Method 2. More specifically, the analysis unit 34 determines whether the number of images of the first image group is half the number of images of the second image group and whether the aspect ratio of the first image is different from the aspect ratio of the second image, to determine the recommended setting for the front and back combining function.

For example, when the number of images of the first image group is half the number of images of the second image group, and the aspect ratio of a case where two second images combined vertically or horizontally is equivalent to the aspect ratio of the first image (i.e., the difference between the aspect ratios is less than a predetermined value), the setting for the front and back combining function in the scanner A is estimated as ON. In this case, the analysis unit 34 determines the recommended setting for the front and back combining function as "ON." When the above condition is not met, the front and back combining function in the scanner A is estimated as OFF, and the analysis unit 34 determines the recommended setting for the front and back combining function as "OFF."

Vertical Split Function

The setting item relating to the vertical split function (in the following description, referred to simply as "vertical split function") is a setting item for setting a function of automatically dividing an image (image data) into upper and lower parts. Examples of the setting value of the vertical split function include "Split function ON (enabled)" and "Split function OFF (disabled)." The analysis unit 34 determines a recommended setting for the vertical split function using a multiple-sheet original document. The analysis unit 34 compares the number of images and the aspect ratio between images to be compared in the comparison analysis (i.e., between the first image group and the second image group), to determine the recommended setting for the vertical split function. This determination corresponds to the Method 2. More specifically, the analysis unit 34 determines whether the number of images of the first image group is a multiple of the number of images of the second image group and whether the aspect ratio of the first image is different from the aspect ratio of the second image, to determine the recommended setting for the vertical split function.

For example, when the number of images of the first image group is a multiple of the number of images of the second image group, and the aspect ratio of two first images combined vertically or horizontally is equivalent to the aspect ratio of the second image (e.g., the difference between the aspect ratios is less than a predetermined value), the setting for the vertical split function in the scanner A is estimated as ON. In this case, the analysis unit 34 determines the recommended setting for the vertical split function as "ON." When the above condition is not met, the vertical split function in the scanner A is estimated as OFF, and the analysis unit 34 determines the recommended setting for the vertical split function as "OFF."

The analysis unit 34 performs processing (e.g., image processing) for reflecting the first recommended setting (e.g., the recommended settings for the color mode, the resolution, the automatic cropping function, the paper size, the scan side, the blank page deletion function, the front and back combining function, and the vertical split function) on the second image group, to acquire one or a plurality of first processed images, which is the second image group reflecting the first recommended settings. In the following description, the one or the plurality of first processed images thus acquired is referred to as a "first processed image group." Reflecting the recommended setting on an image (or an image group) means to adjusting the image (or the image group) to the recommended setting. For example, reflecting the recommended setting on an image (or an image group) mean to make the image (or the image group) to be an image (or an image group) obtained by applying the recommended setting. For example, when the second image group is acquired with a resolution of 600 dpi and the recommended setting (e.g., the estimated setting in the scanner A) is determined as 300 dpi, reflecting the recommended setting on the second image group means to convert (performing image processing to convert) the resolution of the second image group to 300 dpi, which is the recommended setting. Further, for example, when the recommended setting of the blank page deletion function is ON, a blank page deletion process (image processing) is performed on the second image group to delete a blank page or pages from the second image group, thus reflecting the recommended setting for the blank page deletion function "ON" on the second image group.

When the second image group is acquired by the scanner B with the same setting as the first recommended setting (i.e., when the first recommended setting is already reflected on the second image group), the process for reflecting the first recommended setting on the second image group may be omitted. In other words, regarding a recommended setting which has not been reflected on the second image group (i.e., a setting different from the setting when the second image is acquired by the scanner B) among the determined recommended settings, the analysis unit 34 performs a process for reflecting such a recommended setting on the second image group. Regarding a recommended setting which has been already reflected on the second image group, the analysis unit 34 may omit performing a process for reflecting such a recommended setting on the second image group. In this way, the analysis unit 34 performs a process based on the recommended setting as needed.

In the present embodiment, a case where the first processed image group is acquired by performing image processing based on the recommended setting for the setting item belonging to the group (independent group) on the second image group is described for an illustrative purpose. However, when the process for reflecting the first recommended setting is omitted as described above, the first processed image group (i.e., the second image group reflecting the first recommended setting) is the second image group.

First Dependent Group

The analysis unit 34 determines a recommended setting (i.e., a second recommended setting) for the setting item belonging to the first dependent group by performing a comparison analysis between the first image group and the second image group after the first recommended setting is reflected on the second image group (i.e., the process according to the first recommended setting is performed on the second image group). In other words, the analysis unit 34 determines the recommended setting for the setting item belonging to the first dependent group by performing the comparison analysis between the first image group and the first processed image group. The setting item belonging to the first dependent group is a setting item relating to detection process. The recommended setting for the setting item belonging to the first dependent group is determined on the assumption that the recommended setting for the independent group be reflected on the second image group (i.e., image processing using the recommended setting is completed) in advance. For example, by making the setting value of the automatic cropping function or the paper size for the first image group match the setting value of the automatic cropping function or the paper size for the second image group in advance, the recommended setting for the setting item belonging to the first dependent group is determined appropriately. A specific method of determining the recommended settings for the setting items belonging to the first dependent group is described below.

Punch Hole Removal Function

A setting item relating to the punch hole removal function (in the following description, referred to simply as a "punch hole removal function") is a setting item for setting a function of, when an original document includes a punch hole, filling the punch hole portion in an image to make the punch hole portion inconspicuous. Examples of the setting value of the punch hole removal function include "ON (enabled)" and "OFF (disabled)." The analysis unit 34 performs the following comparison analysis (i.e., comparison between images on which a punch hole removal process has been performed) between images corresponding to the same original document among images to be compared in the comparison analysis. In other words, the analysis unit 34 performs the following comparison analysis between the first image and the first processed image corresponding to the same original document. The analysis unit 34 performs the punch hole removal process on the first processed image, and determines whether the punch hole is removed. When the punch hole removal function includes multiple modes, the analysis unit 34 performs processing corresponding each of the modes. When the determination result indicates that the punch hole is removed, the analysis unit 34 compares an area in which the punch hole is removed in the first processed image from which the punch hole is removed with an area in the first image corresponding to the area in the first processed image, and determines whether color information of both areas gets closer to each other. In other words, the analysis unit 34 determines the degree of similarity of the color information. For example, when the color information of the first processed image and the color information of the second processed image get closer to each other (similar to each other) by performing the punch hole removal process on the first processed image than before performing the punch hole removal process, the punch hole removal function in the scanner A is estimated as ON. In this case, the analysis unit 34 determines the recommended setting for the punch hole removal function as "ON." This determination corresponds to the Method 3. The determination as to whether the color information gets closer is made by any desired method such as a method of generating histograms of the areas and comparing the generated histograms and a method using pattern matching. The recommended setting for the punch hole removal function may be determined in conjunction with the recommended setting for the setting item belonging to the independent group. For example, when the recommended setting of the automatic cropping function belonging to the independent group is "OFF (disabled)," the recommended setting of the punch hole removal function may be set to "OFF (disabled)" in conjunction with the recommended setting of the automatic cropping function.

Orientation Correction Function

A setting item relating to the orientation correction function (in the following description, referred to simply as an "orientation correction function") is a setting item for setting a method of rotating an image. Examples of the setting value of the orientation correction function include "automatic," "90 degrees clockwise," "180 degrees clockwise," and "90 degrees counterclockwise." The analysis unit 34 performs the following comparison analysis between images corresponding to the same original document among images to be compared in the comparison analysis. In other words, the analysis unit 34 performs the following comparison analysis between the first image and the first processed image corresponding to the same original document. Since the second image according to the present embodiment is an image acquired with the setting of the orientation correction function "automatic," it is assumed that the first processed image is an image whose orientation is automatically corrected as needed.

First, the analysis unit 34 determines whether the orientations of the first image and the first processed image are the same. For example, on the basis of the image sizes (aspect ratios) of the first image and the first processed image, the analysis unit 34 determines whether both of the images are in portrait orientation (or in landscape orientation) or one of the images is in portrait orientation and the other image is in landscape orientation. This determines whether the difference in orientation between the two images (i.e., the rotation angle that makes the orientations of the two images match each other) is 0 degrees or 180 degrees, or 90 degrees or 270 degrees, and narrows rotation candidate angles used in pattern matching to be performed subsequently. Subsequently, the analysis unit 34 rotates one of the images on the basis of the determined rotation angle, and performs pattern matching (image comparison) on the two images. For example, when the determined rotation angle is 90 degrees or 270 degrees, rotation processing is performed on the first processed image (or the first image) by the rotation angle of 90 degrees or 270 degrees, and then the pattern matching between the first image and the first processed image is performed. Specifically, for each of the two images, the analysis unit 34 calculates feature points and feature amounts from the entire image (e.g., calculates using a method such as AKAZE). The analysis unit 34 compares the calculated feature points between the two images, to determine a rotation angle at which the number of feature points whose positions and orientations match between the two images is largest. For example, the analysis unit 34 determines that the number of feature points whose positions and orientations match is largest at the rotation angle of 90 degrees (i.e., when the first processed image is rotated by 90 degrees clockwise), the analysis unit 34 determines that the orientation of the first image is the orientation obtained by rotating the first processed image by 90 degrees clockwise. Thus, the relative relationship between the orientations of the two images can be determined (judged) by the above-described method.

When the orientations of the two images are determined as the same by the above-described method, the setting of the orientation correction function in the scanner A is estimated as "automatic," which is a setting for automatically rotating the orientation of an image when an original document placed in landscape orientation or upside-down is scanned. In this case, the analysis unit 34 determines the recommended setting for the orientation correction function as "automatic." This determination corresponds to the Method 2 and the Method 3. By contrast, when the orientations of the two images are determined as different, the setting of the orientation correction function in the scanner A is estimated as a rotation fixed setting. In this case, the analysis unit 34 determines the rotation fixed setting (specifically, a fixed value of the rotation angle) corresponding to the orientation of the first image as the recommended setting of the orientation correction function. This determination corresponds to the Method 2 and the Method 3. For example, when the orientations of the two images are different by 180 degrees, the 180-degree fixed rotation is determined as the recommended setting. The above-described method is applicable on the assumption that an original document (a sheet) is inserted in the same direction in the scanner A and the scanner B. When the second image is an image on which image processing of automatic orientation correction is not performed, the recommended setting of the orientation correction function is determined by the same or substantially the same method as the above-described method by performing image processing of automatic orientation correction on the first processed image in advance before comparing the aspect ratios in the above-described method. This determination corresponds to the Method 3.

The analysis unit 34 performs processing (e.g., image processing) for reflecting the second recommended setting (e.g., the recommended settings for the punch hole removal function and the orientation correction function) on the first processed image group, to acquire one or a plurality of second processed images, which is the second image group reflecting the first recommended settings and the second recommended settings. In the following description, the one or the plurality of second processed images thus acquired is referred to as a "second processed image group." When the second image group is acquired by the scanner B with the same setting as the second recommended setting (i.e., when the second recommended setting is already reflected on the second image group), the process for reflecting the second recommended setting on the first processed image group may be omitted. In other words, in the same or substantially the same manner as described above for the first group, the analysis unit 34 performs a process based on the recommended setting as needed. In the present embodiment, a case where the second processed image group is acquired by performing image processing based on the recommended setting for the setting item belonging to the group (the first dependent group) on the first processed image group is described for an illustrative purpose. However, when the process for reflecting the second recommended setting is omitted as described above, the second processed image group (i.e., the second image group reflecting the first recommended setting and the second recommended setting) is the first processed image group. Alternatively, the analysis unit 34 may acquire the second processed image group by performing processing (image processing) based on the first recommended setting and the second recommended setting on the second image group.

Second Dependent Group

The analysis unit 34 determines a recommended setting (i.e., a third recommended setting) for the setting item belonging to the second dependent group by performing a comparison analysis between the first image group and the second image group after the first recommended setting and the second recommended setting are reflected on the second image group (i.e., the process according to the first recommended setting and the second recommended setting is performed on the second image group). In other words, the analysis unit 34 determines the recommended setting for the setting item belonging to the second dependent group by performing the comparison analysis between the first image group and the second processed image group. The setting item belonging to the second dependent group is a setting item relating to image quality. Since the content of an image (i.e., content information) is a target in the setting item belonging to the second dependent group, it is assumed that the recommended settings up to the first dependent group be reflected on the second image group (i.e., image processing using the recommended settings is completed) in advance. A specific method of determining the recommended settings for the setting items belonging to the second dependent group is described below.

Brightness Adjustment Function, Background Pattern Removal Function, Noise Removal Function A setting item relating to the brightness adjustment (tone adjustment) function (in the following description, referred to simply as a "brightness adjustment function") is a setting item for setting the brightness (tone) of an image to be output. Examples of the setting item relating to the brightness adjustment function include a setting item for using a predetermined brightness conversion table (e.g., a lookup table (LUT)) and a setting item relating to other various brightness adjustments such as brightness, a color density, a hue, and color temperature. The analysis unit 34 performs the following comparison analysis between images corresponding to the same original document (page) among images to be compared in the comparison analysis. In other words, the analysis unit 34 performs the following comparison analysis between the first image and the second processed image corresponding to the same original document. In the following, a method of determining the recommended setting is described for each of Case 1 and Case 2. The Case 1 is a case where the recommended setting for the color mode is determined as "color" or "gray" in the recommended settings in the independent group. The Case 2 is a case where the recommended setting for the color mode is determined as "binary."

In the Case 1, the analysis unit 34 calculates (generates) a brightness histogram for each of images to be compared in a comparison analysis (i.e., the first image and the second processed image) after graying the images. The analysis unit 34 compares the calculated histograms, to create a brightness correspondence (e.g., a brightness conversion table) in which the two histograms substantially match. Thus, the analysis unit 34 determines that the recommended setting for the setting item relating to the brightness adjustment is a setting in which the generated brightness conversion table is used. This determination corresponds to the Method 2. In the Case 2, the analysis unit 34 performs image processing corresponding to combinations of setting values of one or more parameters relating to brightness adjustment (including other parameters relating to an image quality such as the background pattern removal function and the noise removal function) on the second processed image in a brute-force manner. The analysis unit 34 determines a setting (i.e., a combination of the setting values) in which character recognition results (e.g., optical character recognition (OCR) results) of the first image and the second processed image after the image processing is performed match most as a recommended setting of the brightness adjustment function. This determination corresponds to the Method 3. Instead of determining the setting in which the character recognition results most match as the recommended setting, any setting in which the first image and the second processed image most match as a result of the comparison between the two images may be determined as the recommended setting. For example, a setting in which the first image and the second processed image most match as a result of pattern matching may be determined as the recommended setting.

The brightness adjustment function includes an automatic brightness correction function, which is a function of automatically setting (correcting) appropriate brightness for each of original documents (images). Examples of the setting value of a setting item relating to the automatic brightness correction function (in the following description, referred to simply as an "automatic brightness correction function" include "ON (enabled)" and "OFF (disabled)" The analysis unit 34 determines a recommended setting for the setting item relating to the automatic brightness correction function using a multiple-sheet original document. More specifically, first, the analysis unit 34 compares the image brightness histograms between images relating to the same sheet of the original document (i.e., between the first image and the second processed image) among the images to be compared in the comparison analysis. Further, the analysis unit 34 calculates a brightness correspondence (LUT) between the images relating to the same sheet of the original document obtained by performing the comparison, and compares the calculated brightness correspondences between sheets, to determine the recommended setting for the automatic brightness correction function.

Figure 3A:
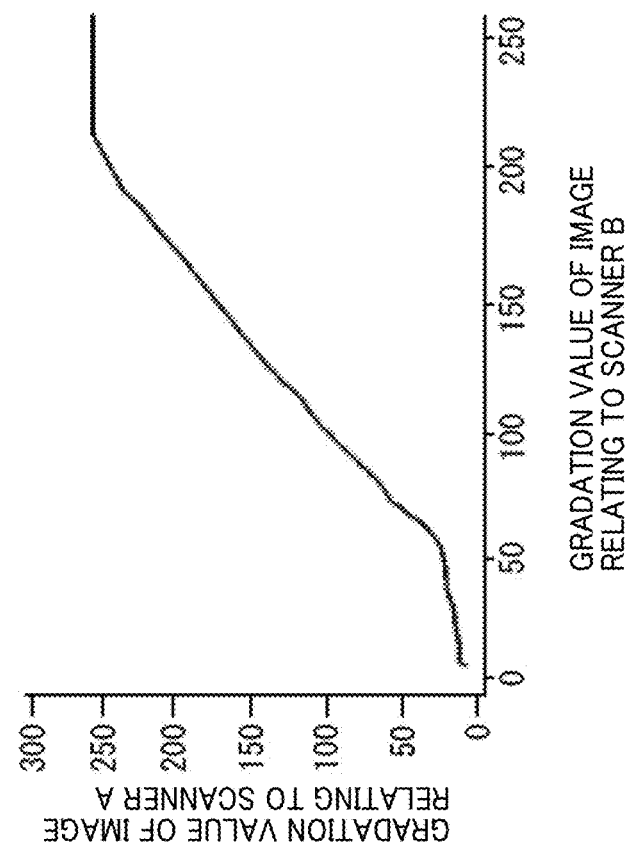
FIG. 3A and FIG. 3B are graphs each illustrating a lookup table (LUT) between images of an original document when an automatic brightness correction function is OFF in a scanner A, according to an embodiment of the present disclosure.
Figure 3B:
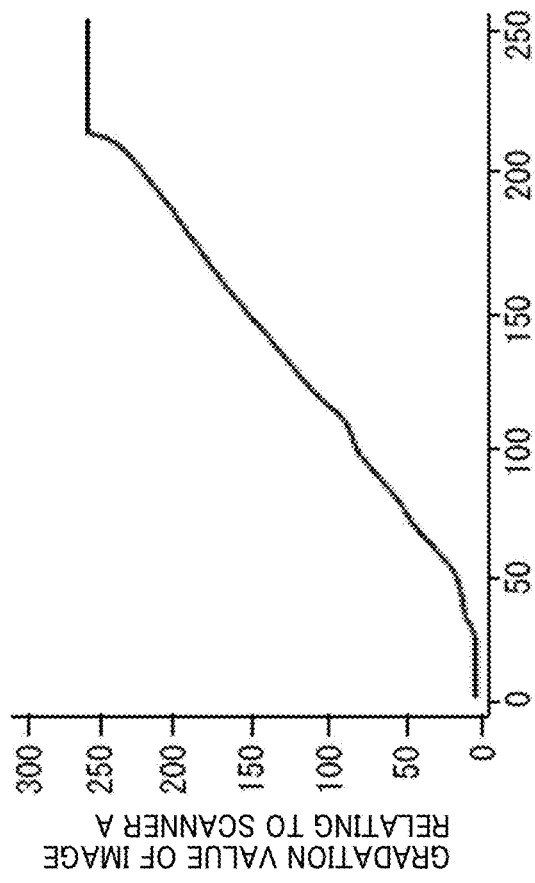

FIG. 3A and FIG. 3B are graphs each illustrating an LUT between images of an original document when the automatic brightness correction function is OFF in the scanner A, according to the present embodiment. FIG. 3A is an LUT illustrating the brightness correspondence between the first image (i.e., an image relating to the scanner A) relating to the first sheet of the original document and the second processed image (i.e., an image relating to the scanner B) relating to the first sheet of the original document. FIG. 3B is an LUT illustrating the brightness correspondence between the first image relating to the second sheet of the original document and the second processed image relating to the second sheet of the original document. In FIG. 3A and FIG. 3B, the horizontal axis represents the brightness value (gradation value) in the second processed image, and the vertical axis represents the brightness value in the first image. The graphs of FIG. 3A and FIG. 3B indicate that when the automatic brightness correction is not performed in the scanner A (and also in the scanner B), the brightness correspondence between the images is substantially the same in any sheet of the original document.

Figure 4B:
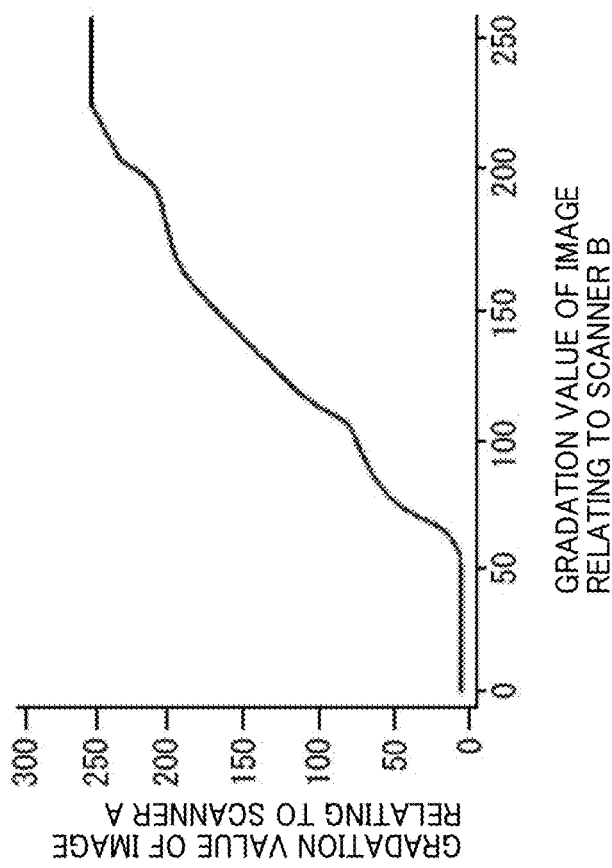
FIG. 4A and FIG. 4B are graphs each illustrating a LUT between images of an original document when the automatic brightness correction function is ON in the scanner A, according to an embodiment of the present disclosure.
Figure 4A:
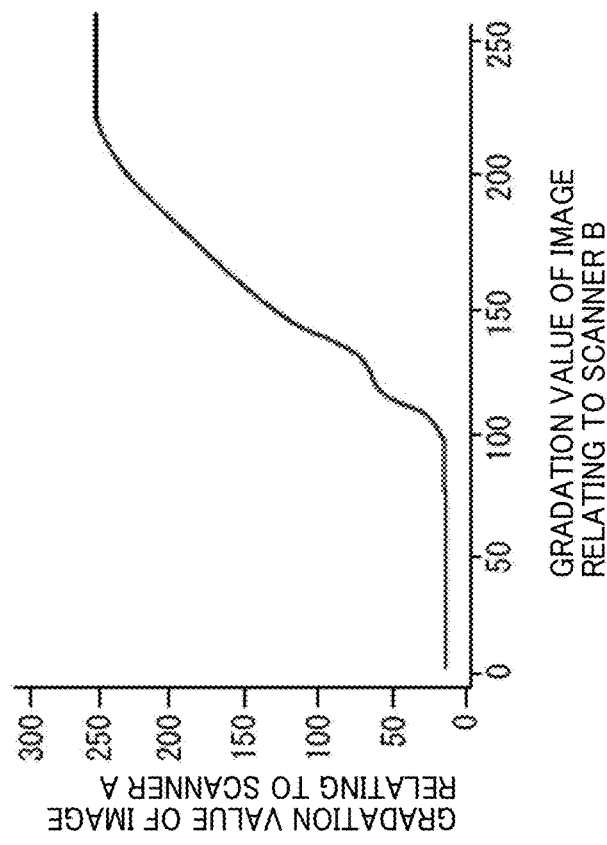

FIG. 4A and FIG. 4B are graphs each illustrating an LUT between images of an original document when the automatic brightness correction function is ON in the scanner A, according to the present embodiment. FIG. 4A is an LUT illustrating the brightness correspondence between the first image relating to the first sheet of the original document and the second processed image relating to the first sheet of the original document. FIG. 4B is an LUT illustrating the brightness correspondence between the first image relating to the second sheet of the original document and the second processed image relating to the second sheet of the original document. In FIG. 4A and FIG. 4B, the horizontal axis represents the brightness value in the second processed image, and the vertical axis represents the brightness value in the first image. The graphs of FIG. 4A and FIG. 4B indicate that when the automatic brightness correction is performed in the scanner A, the brightness correspondence between the images may vary greatly depending on the sheets of the original document.

Accordingly, the analysis unit 34 determines whether the brightness correspondences between the images (between the first image and the second processed image) substantially match between the original documents (pages). When the determination result indicates that the brightness correspondences substantially match between the sheets of the original document, the analysis unit 34 estimates that the automatic brightness correction function in the scanner A is OFF. In this case, the analysis unit 34 determines the recommended setting for the automatic brightness correction function as "OFF." This determination corresponds to the Method 2. By contrast, when the brightness correspondences do not substantially match between the sheets of the original document, the automatic brightness correction function in the scanner A is estimated as ON. In this case, the analysis unit 34 determines the recommended setting for the automatic brightness correction function as "ON." This determination corresponds to the Method 2. The determination as to whether the brightness correspondence (LUT) substantially matches between the original documents can be made using, for example, a correlation coefficient. For example, the analysis unit 34 calculates a correlation coefficient between the gradation values of the image relating to the scanner A corresponding to the gradation values of the image relating to the scanner B in the LUT of the first sheet of the original document and the gradation values of the image relating to the scanner A corresponding to the gradation values of the image relating to the scanner B in the LUT of the second sheet of the original document. When the calculated correlation is greater than or equal to a predetermined value (threshold), the analysis unit 34 determines that the LUTs substantially match between the sheets of the original document. Any desired method other than the method using the correlation coefficient may be used in the determination of whether the brightness correspondences substantially match between the sheets of the original document.

The analysis unit 34 performs processing (e.g., image processing) for reflecting the third recommended setting (e.g., the recommended settings for the brightness adjustment function, the background pattern removal function, the noise removal function, and the automatic brightness correction function) on the second processed image group, to acquire one or a plurality of third processed images, which is the second image group reflecting the first recommended settings, the second recommended settings, and the third recommended settings. In the following description, the one or the plurality of third processed images thus acquired is referred to as a "third processed image group." When the second image group is acquired by the scanner B with the same setting as the third recommended setting (i.e., when the third recommended setting is already reflected on the second image group), the process for reflecting the third recommended setting on the second processed image group may be omitted. In other words, in the same or substantially the same manner as described above for the first group, the analysis unit 34 performs a process based on the recommended setting as needed. In the present embodiment, a case where the third processed image group is acquired by performing image processing based on the recommended setting for the setting item belonging to the group (the second dependent group) on the second processed image group is described for an illustrative purpose. However, when the process for reflecting the third recommended setting is omitted as described above, the third processed image group (i.e., the second image group reflecting the first recommended setting, the second recommended setting, and the third recommended setting) is the second processed image group. Alternatively, the analysis unit 34 may acquire the third processed image group by performing processing (image processing) based on the first recommended setting, the second recommended setting, and the third recommended setting on the second image group.

Third Dependent Group

The analysis unit 34 determines a recommended setting (i.e., a fourth recommended setting) for the setting item belonging to the third dependent group by performing a comparison analysis between the first image group and the second image group after the first recommended setting, the second recommended setting, and the third recommended setting are reflected on the second image group (i.e., the process according to the first recommended setting, the second recommended setting, and the third recommended setting is performed on the second image group). In other words, the analysis unit 34 determines the recommended setting for the setting item belonging to the third dependent group by performing the comparison analysis between the first image group and the third processed image group. A specific method of determining the recommended settings for the setting items belonging to the third dependent group is described below.

Smoothing Function

A setting item relating to the smoothing function (in the following description, referred to simply as a "smoothing function") is a setting item for setting a function of performing a smoothing process on an image. Examples of the setting value of the smoothing function include "ON (enabled)," "OFF (disabled)," and setting values of various setting items relating to the smoothing function, such as edge enhancement, moire removal, and background smoothing. The analysis unit 34 performs the following comparison analysis between images corresponding to the same original document (page) among images to be compared in the comparison analysis. In other words, the analysis unit 34 performs the following comparison analysis between the first image and the third processed image corresponding to the same original document. The analysis unit 34 extracts a particular area (partial area) in each of images (i.e., the first image and the third processed image) corresponding to the same original document among images to be compared. The analysis unit 34 compares the degree of variation in color (pixel values) in the particular area between the two images to determine the recommended setting for the smoothing function. This determination corresponds to the Method 2. The recommended setting for the smoothing function is determined on the assumption that the resolutions of the images match in advance. This is because a moire fringe and a color shift appear differently depending on the resolution. Further, the recommended setting for the smoothing function is determined on the assumption that the brightness (tones) of the images match in advance. This is because, for example, when a strong contrast is applied to the first image to enhance the appearance of an output image, most of colors close to white are output as white, and thus, when the brightness adjustment is not performed on the third processed image (i.e., the second image) to match the first image, the comparison between the third processed image and the first image may lead to an erroneous determination indicating that the smoothing process is performed on the first image. For this reason, the determination of the recommended setting for the smoothing function is performed on the assumption that the recommended settings up to the second dependent group are reflected in the second image group, in other words, on the assumption that image processing based on the recommended settings is completed. On the above assumptions, the analysis unit 34 extracts the partial area in each of the images, and calculates a degree of variation in gradation (color) for the partial area of each of each of the images. The degree of variation (color) is, for example, a standard deviation of a center color gradation value (RGB gradation value).

Figure 5B:
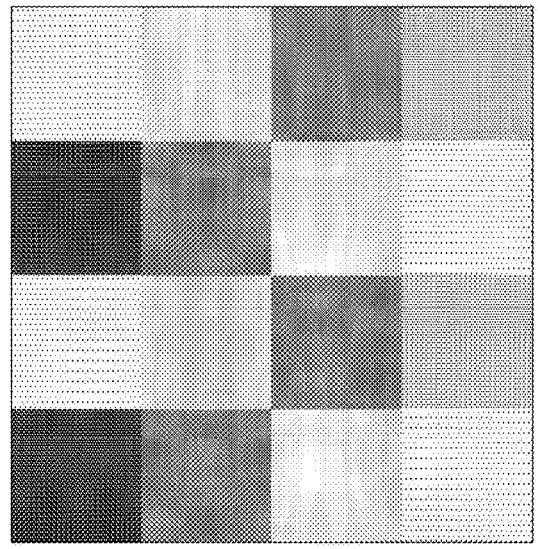
FIG. 5A and FIG. 5B are diagrams for describing a method of determining a recommended setting for a smoothing function, according to an embodiment of the present disclosure.
Figure 5A:
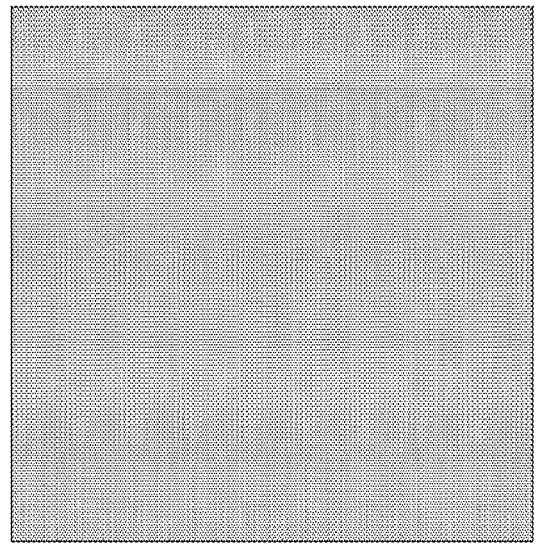

FIG. 5A and FIG. 5B are diagrams for describing a method of determining the recommended setting for the smoothing function, according to the present embodiment. FIG. 5A illustrates a partial area of an output image by the scanner A (i.e., the first image) on which the smoothing process is performed. FIG. 5B illustrates a partial area of an output image by the scanner B (i.e., the third processed image) on which the smoothing process is not performed. The diagrams of FIG. 5A and FIG. 5B indicate that the degree of variation (standard deviation) in gradation is smaller in the partial area of the first image than in the partial area of the third processed image due to the influence of the smoothing process.

Thus, when the value obtained by the following expression is equal to or less than a predetermined threshold value, the analysis unit 34 estimates that the smoothing process is performed in the scanner A.

Expression: (the standard deviation of the gradation value in the partial area of the first image)/(the standard deviation of the gradation value in the partial area of the third processed image)

In this case, for example, the analysis unit 34 determines the recommended setting for the smoothing function as "ON," so that the smoothing process is performed in the scanner B. This determination corresponds to the Method 2. The analysis unit 34 may change the degree of smoothing in the recommended setting according to the value obtained by the above expression. Further, instead of the value obtained by the above expression, a difference between the two standard deviations may be used. The predetermined threshold value may be any desired value.

In the above-described method, the partial area (particular area) is selected in each of the images (i.e., the first image and the third processed image). It is preferable that a partial area corresponding to the same or substantially the same portion such as the same object or the same character between the images is selected. A method of selecting the particular area is described below. The method includes a Method A and a Method B. In the first method (i.e., the Method A), edges are extracted from each of the image, and an area surrounded by a certain edge is selected as the particular area. For example, in each of the images, a particular frame line (black line) in a form is detected as an edge, and an area within the particular frame line (edge) is selected as the particular area. In the second method (i.e., the Method B), color clustering is performed on each of the images, and an area having the same color and a size equal to or larger than a predetermined size is selected as the particular area. For example, when an area of green as a background color is equal to or larger than a certain size, the area of green as a background color is selected as the particular area. Instead of using the Method A or the Method B, a method of selecting a partial area designated by predetermined coordinates in the two images as the particular area may be used. Alternatively, a method of selecting the particular area by performing alignment (coordinate alignment) of the particular area between the images by, for example, pattern matching may be used.

In addition to or in alternative to the above-described methods, a method (i.e., a Method 3) may be used. According to the Method 3, image processing using candidate values (combinations of candidate values (setting values)) of parameters (setting items) relating to the smoothing function is performed on the third processed image in a brute-force manner, and the first image and the third processed image are compared after the image processing is performed. As a result of the comparison, a particular candidate value (a particular combination of candidate values) at which the third processed image is closest to (most similar to) the first image is determined as the recommended setting for the smoothing function. Examples of the parameter (setting item) relating to the smoothing function include a setting item relating to sharpness such as the edge enhancement and the moire removal function (a moire filter) and a setting item relating to a function of reducing or preventing color unevenness and density unevenness by smoothing the background of an image (in the following description, referred to as "color cleanup"). The edge enhancement is a function of emphasizing an edge by applying a filter. The moire removal function (the moire filter) is a function of blurring the entire image by applying a filter. The color cleanup is, for example, a function of performing color clustering on an image and replacing a color around a peak with a peak color (i.e., adjusting a peripheral value with smoothness), or a function of replacing an area predicted as a background with white. Examples of the setting value of the setting items relating to the sharpness and the color cleanup include "Enabled (not available)" and multiple setting values (e.g., levels (Lv) or smoothness) as the intensity setting values (sensitivity setting values) in the case of "On (enabled)."

The analysis unit 34 defines possible setting values of each of the setting items as candidate values, and performs processing (image processing) on the third processed image using combinations (e.g., all combinations) of the candidate values corresponding to multiple setting items among the setting values. The analysis unit 34 determines (adopts) a combination of the candidate values at which the third processed image on which the processing has been performed is closest to the first image as the recommended setting for the multiple setting items. The analysis unit 34 calculates, for example, for all of the combinations, a standard deviation (standard deviation of color) in a partial area (particular area) of the third processed image on which the image processing has been performed. The analysis unit 34 determines a combination of candidate values at which the calculated standard deviation is closest to the standard deviation in the partial area of the first image as the recommended setting for the smoothing function. In the present embodiment, a case where the smoothing function is the setting item belonging to the third dependent group is described for an illustrative purpose. Alternatively, a setting item relating to color may be included in the third dependent group, and a recommended setting for color may be determined.

The analysis unit 34 performs processing (e.g., image processing) for reflecting the fourth recommended setting (e.g., the recommended setting for the smoothing function) on the third processed image group, to acquire one or a plurality of fourth processed images, which is the second image group reflecting the first recommended settings, the second recommended settings, the third recommended settings, and the fourth recommended settings. In the following description, the one or the plurality of fourth processed images thus acquired is referred to as a "fourth processed image group." When the second image group is acquired by the scanner B with the same setting as the fourth recommended setting (i.e., when the fourth recommended setting is already reflected on the second image group), the process for reflecting the fourth recommended setting on the third processed image group may be omitted. In other words, in the same or substantially the same manner as described above for the first group, the analysis unit 34 performs a process based on the recommended setting as needed. In the present embodiment, a case where the fourth processed image group is acquired by performing image processing based on the recommended setting for the setting item belonging to the group (the third dependent group) on the third processed image is described for an illustrative purpose. However, when the process for reflecting the fourth recommended setting is omitted as described above, the fourth processed image group (i.e., the second image group reflecting the first recommended setting, the second recommended setting, the third recommended setting, and the fourth recommended setting) is the third processed image group. Alternatively, the analysis unit 34 may acquire the fourth processed image group by performing processing (image processing) based on the first recommended setting, the second recommended setting, the third recommended setting, and the fourth recommended setting on the second image group.

Method for Determining One Recommended Setting in Case of Inconsistency

A description is now given of a method of determining one recommended setting from different recommended settings when determined recommended settings are different between original documents (pages) (i.e., when there is a mismatch). The method includes two methods. In the first method, a recommended setting that has the least overall influence is selected from the different recommended settings. In other words, a recommended setting that causes no problem when processing based on the recommended setting is performed is selected. For example, when there is no punch hole in the first image and there is a punch hole in the second image in the first sheet (page) of an original document, the recommended setting for the punch hole removal function for the first original document is "ON (enabled)." On the other hand, when there are no punch holes in both an image relating to the scanner A and an image relating the scanner B in the second sheet of the original document, the recommended setting for the punch hole removal function in the second sheet of the original document may be "OFF (disabled)." In such a case, when the "punch hole removal function OFF" is proposed to a user, the punch hole is not removed from an original document like the first sheet of the original document, and this causes influence. In other words, an image obtained by the scanner A and an image obtained by the scanner B are not the same. By contrast, in this case, when the "punch hole removal function ON" is proposed to a user, a punch hole removal process is performed in response to detection of a punch hole. Accordingly, no influence is caused on an original document like the first sheet and an original document like the second sheet. For this reason, in such a case, a recommended setting that has the least overall influence is adopted (proposed). In other words, a recommended setting according to which an image equivalent to an image obtained by the scanner A is obtained as the entire original document is adopted (proposed).

In the second method, one recommended setting is selected statistically from different recommended settings.

For example, when a five-sheet original document is used, when the smoothing function disabled (not available) is determined as the recommended setting for one sheet of the original document and the smoothing function enabled (available) is determined as the recommended setting for the remaining four sheets of the original document, the smoothing function enabled is adopted (proposed) by majority vote.

The method of determining the recommended setting for each of the setting items is not limited to the method described above, and various other methods may be used.

As described above, in the present embodiment, the recommended settings in the scanner B are determined by performing the comparison analysis between the first image group and the second image group (or the second image group reflecting the recommended setting) while applying the recommended settings (processes based on the recommended settings) to the second image stepwise.

The presentation unit 35 presents the recommended settings (the first recommended setting, the second recommended setting, the third recommended setting, and the fourth recommended setting) determined by the analysis unit 34 to a user. Any desired method may be used as a method of presenting the recommended settings. For example, a method of presenting the recommended settings by displaying a list associating the setting items that are the recommended settings with the setting values (recommended values) on a setting screen via the output device 16 may be used. Alternatively, a method of providing information regarding the recommended settings to a user via the communication unit 17 may be used. When the user checks the presented recommended setting and finds an error (an item whose setting is to be changed), the user is allowed to change the setting content of a desired item. Further, the presentation unit 35 may present one or a plurality of images (i.e., the fourth processed image group) obtained by performing the processing (image processing) according to the recommended settings determined by the analysis unit 34 on the second image group to a user. This allows the user who looks at the presented image (i.e., the image on which the image processing is performed) to check the influence on an output image due to the change of the setting (the image subjected to the image processing). Accordingly, the user can determine whether to change the setting while checking the influence on the output image due to the change of the setting. A recommended setting generation screen (recommended setting determination screen), which is a user interface (UI) for presenting the recommended setting to a user by the presentation unit 35, is described below.

Figure 6:
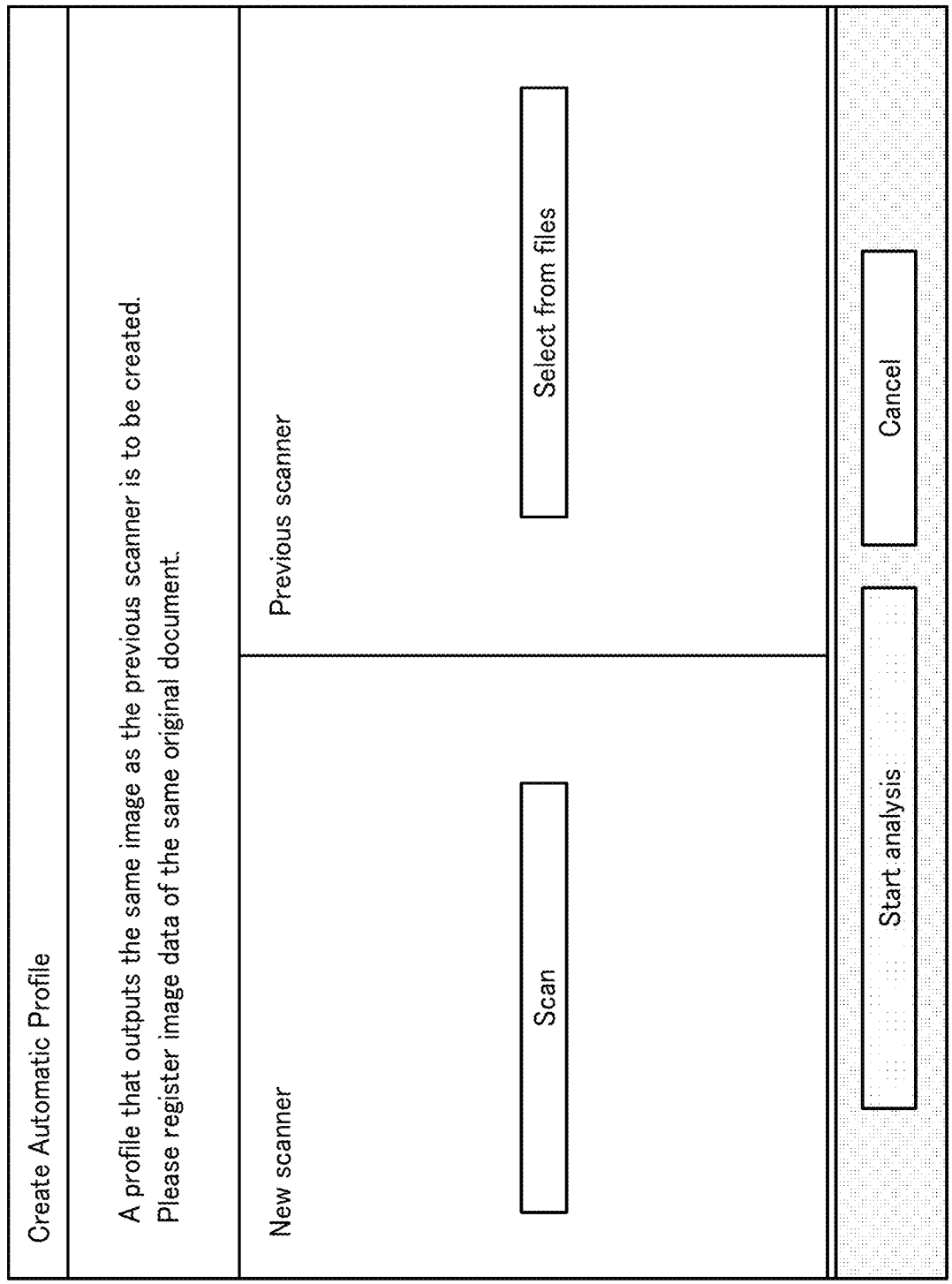
FIG. 6 is a diagram illustrating a recommended setting generation screen displayed at the start, according to an embodiment of the present disclosure.

FIG. 6 is a diagram illustrating a recommended setting generation screen displayed at the start, according to the present embodiment. As illustrated in FIG. 6, the recommended setting generation screen displayed when the recommended setting determination process is started includes a "scan" button and a "select from files" button. The "scan button" is a button to be pressed by a user to acquire (scan) one or more scanned images (i.e., the second image group) by a scanner as a replacement (i.e., the scanner B). The "select from files" button is a button to be pressed to acquire one or more scanned images (i.e., the first image group) by the scanner to be replaced (i.e., the scanner A). In response to pressing of the "scan" button by a user, the scanner B reads a single-sheet original document or a multiple-sheet original document. Thus, the second image group is acquired. Further, in response to pressing of the "select from files" button by a user to select one or more target images (the first image group) from a folder, one or more scanned images (i.e., the first image group) scanned by the scanner A and stored in the storage device 14 in advance are acquired.

FIG. 7 is a diagram illustrating the recommended setting generation screen displayed at the start of analysis, according to the present embodiment. As illustrated in FIG. 7, on the recommended setting generation screen displayed when the analysis process is started, the acquired first image group is displayed in the frame of "previous scanner," and the acquired second image group is displayed in the frame of "new scanner." FIG. 7 illustrates a case where scanned images corresponding to a multiple-sheet (page) original document are acquired. In the figure, the first page among four pages is displayed. A user can view the scanned images (the first image and the second image) of the multiple sheets (pages) by pressing a page forward button on the screen. In response to pressing of a "start analysis" button by a user on the screen displaying the acquired first image group and second image group are displayed as illustrated in FIG. 7, the analysis unit 34 performs the analysis process (the comparison analysis). In response to pressing of a "cancel" button by a user, the recommended setting determination process is ended, and the recommended setting generation screen is closed (hidden).

Figure 8:
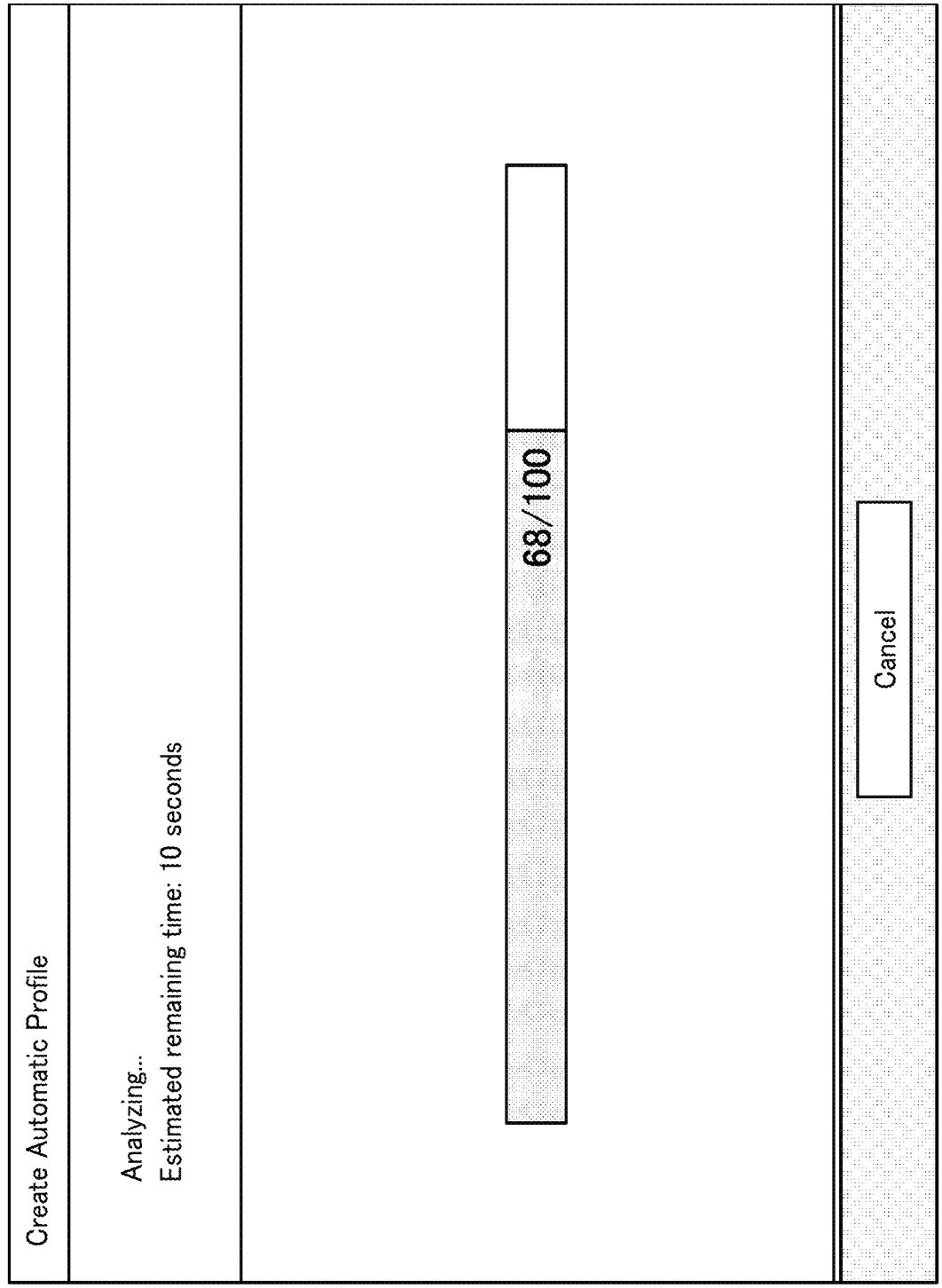
FIG. 8 is a diagram illustrating the recommended setting generation screen displayed during analysis, according to an embodiment of the present disclosure.

FIG. 8 is a diagram illustrating the recommended setting generation screen displayed during the analysis process, according to the present embodiment. As illustrated in FIG. 8, when the analysis process is being performed by the analysis unit 34, information indicating that the analysis process is being performed and information indicating the progress of the analysis process are displayed on the recommended setting generation screen. In FIG. 8, the text "analyzing . . . " and the text "estimated remaining time: 10 seconds" as an estimated time of a remaining time until the analysis process is completed are displayed. In addition, the text "68/100" and a progress bar are displayed as information indicating the progress (e.g., 68% of 100% has been completed). In response pressing of the "cancel" button by a user, the analysis process is ended at the time when the "cancel" button is pressed, and the recommended setting generation screen is closed (hidden).

FIG. 9 is a diagram illustrating the recommended setting generation screen displayed at presenting a recommended setting, according to the present embodiment. As illustrated in FIG. 9, when the analysis process is completed, a recommended setting determined by the analysis process is presented (displayed) on the recommended setting generation screen. In the example of FIG. 9, recommended settings (recommended values) for setting items such as an image type (color mode), a resolution, a paper size, and a punch hole removal are displayed. Further, as illustrated in FIG. 9, for example, an image that can be output with the recommended settings determined by the analysis process and a target image are displayed on the recommended setting generation screen. In other words, the second image on which image processing based on the recommended settings has been performed (i.e., the fourth processed image) and the first image are displayed on the recommended setting generation screen. In response to pressing a "register profile" button by a user on the screen illustrated in FIG. 9, a profile (driver profile) including the recommended settings (the setting items and the recommended values illustrated in FIG. 9) for multiple setting items is registered (stored) in the storage device 14. This allows a user to instruct the scanner B to perform a scan process (including image processing) using the registered profile (a set of settings). Thus, the scanner B obtains an image equivalent to the image output by the scanner A. In response to pressing a "cancel" button by a user on the screen illustrated in FIG. 9, the recommended setting determination process (profile registration process) is ended, and the recommended setting generation screen is closed (hidden). In the present embodiment, the description given above for an illustrative purpose is of a case where the presentation unit 35 generates and displays the recommended setting generation screen. Alternatively, a display unit other than the presentation unit 35 that presents the recommended setting generates and displays the recommended setting generation screen. In the present embodiment, the description given above for an illustrative purpose is of a case where the recommended setting generation screen changes (transitions) in the order from FIG. 6 to FIG. 9 as the process progresses. Alternatively, the screens illustrated in FIG. 6 to FIG. 9 may be displayed individually and thus displayed together with other screens.

Process The specific content of process and processing order described below are examples for implementing the present disclosure. The specific processing content and processing order may be appropriately selected according to the modes of the present disclosure.

Figure 10:
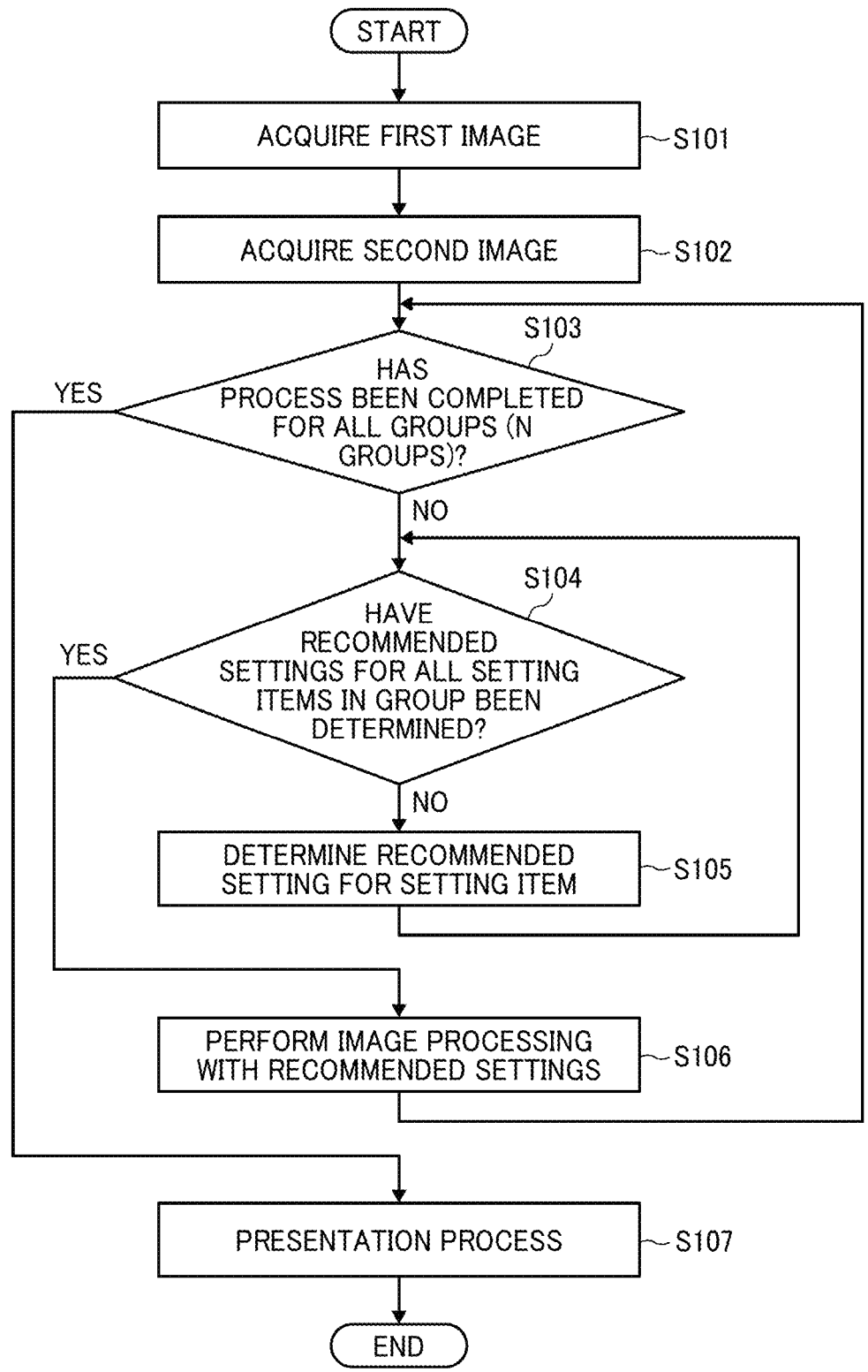
FIG. 10 is a flowchart of an overview of a recommended setting determination process (in the case of N groups), according to an embodiment of the present disclosure.

FIG. 10 is a flowchart of an overview of the recommended setting determination process (in the case of N groups), according to the present embodiment. The process illustrated in the flowchart is started, for example, in response to receiving a user's instruction to determine a recommended setting at the information processing apparatus 1. In response to receiving the instruction from the user, the presentation unit 35 displays the recommended setting generation screen (see FIG. 6) via the output device 16. The process illustrated in the flowchart may be performed for each of types of an original document or (e.g., each of types of work).

In steps S101 and S102, the first image group and the second image group are acquired (see FIG. 6 and FIG. 7). The first-image acquisition unit 32 acquires the first image group, which is one or more images obtained by scanning a single-sheet original document or a multiple-sheet original document by the scanner A (step S101). The second-image acquisition unit 33 acquires the second image group, which is one or more images obtained by scanning the same original document (the single-sheet original document or the multiple-sheet original document) as the original document scanned by the scanner A by the scanner B (step S102). In the present embodiment, the second-image acquisition unit 33 acquires the second image group in the maximum paper size that can be output by the scanner B. With this configuration, when the paper size setting (estimated setting) in the scanner A is smaller than the maximum paper size, trimming corresponding to the paper size setting is performed by performing image processing on the second image group in image processing (step S106) described below.

Further, it is assumed that the second-image acquisition unit 33 acquires the second image group with the double-sided scanning function and the blank page deletion function being OFF. In other words, it is assumed that the second-image acquisition unit 33 acquires all the images. Furthermore, it is assumed that the second-image acquisition unit 33 acquires the second image group at the maximum resolution (e.g., 600 dpi) of the scanner B. With this configuration, when the resolution setting (estimated setting) in the scanner A is smaller than the maximum resolution, the resolution of the second image is reduced by performing image processing on the second image in image processing (step S106) described below. Subsequently, the process proceeds to step S103 in response to, for example, pressing of the "start analysis" button by a user on the screen illustrated in FIG. 7.

In steps S103 to S106, the comparison analysis for determining recommended settings for setting items is performed (see FIG. 8). In step S103, determination is performed as to whether the process has been completed for all of the groups (N groups). The analysis unit 34 determines whether the comparison analysis and the processing (image processing) based on the recommended setting determined by the comparison analysis have been completed for all the groups defined in the classification definition stored in the classification definition storage unit 31 (e.g., all the N groups when the setting items are classified into the N groups by the classification definition). When the process has not been completed for all the groups (No in step S103), the process proceeds to step S104 for the group for which the process has not been completed. By contrast, when the process has been completed for all of the groups (Yes in step S103), the process proceeds to step S107.

In step S104, determination is performed as to whether the recommended settings for all of the setting items in the group have been determined. The analysis unit 34 determines whether the recommended settings for all the setting items belonging to the target group have been determined. When the recommended settings for all of the setting items in the group have not been determined (No in step S104), the process proceeds to step S105. By contrast, when the recommended settings for all of the setting items in the group have been determined (Yes in step S104), the process proceeds to step S106.

In step S105, a recommended setting for a setting item for which a recommended setting has not been determined is determined. The analysis unit 34 determines the recommended setting for the setting item for which the recommended setting has not been determined yet by performing the comparison analysis between the first image group acquired in step S101 and the second image group acquired in step S102 (including the second image group on which image processing is performed in step S106). More specifically, when the setting items are classified into N groups according to the classification definition, the analysis unit 34 determines the recommended settings for all of the groups stepwise in order from the first group. In this step, the analysis unit 34 determines the recommended setting for the setting item belonging to the N-th group by performing the comparison analysis between the first image group and the second image group reflecting the recommended settings for the setting items belonging the groups up to the (N−1)-th group. When N=1, in other words, the recommended setting for the setting item belonging to the first group is determined by performing the comparison analysis between the first image group and the second image group. Subsequently, the process returns to step S104.

In step S106, processing (image processing) based on the recommended setting is performed. The analysis unit 34 performs processing (image processing) according to the recommended settings determined in step S105, so that the second image group reflects the recommended settings for all of the setting items belonging to the target group (N-th group). In the present embodiment, image processing is performed so that the second image group that already reflects the result (i.e., the recommended settings) for the setting items belonging to the groups up to the (N−1)-th group further reflects the result (i.e., the recommended settings) for the setting items belonging to the N-th group. As described above, when the second image group already reflects the result of the N-th group, the image processing for reflecting the result of the N-th group may be omitted. In the present embodiment, the description given above for an illustrative purpose is of a case where the image processing is performed as a process for reflecting the recommended settings. Alternatively, in order to reflect a recommended setting for an image reading item, the original document may be rescanned according to the recommended setting. Subsequently, the process returns to step S103.

In step S107, a presenting process is performed (see FIG. 9). The presentation unit 35 presents the recommended settings (recommended values) for the setting items in all of the groups and the second image group in reflecting the recommended settings for the setting items in all of the groups to the user by displaying the recommended settings and the second image group on a screen. Subsequently, the process illustrated in this flowchart ends. A description is now given of a specific processing flow when the multiple setting items are classified into four groups including one independent group and three dependent groups (i.e., the first dependent group, the second dependent group, and the third dependent group) in the classification definition as described above.

Figure 11:
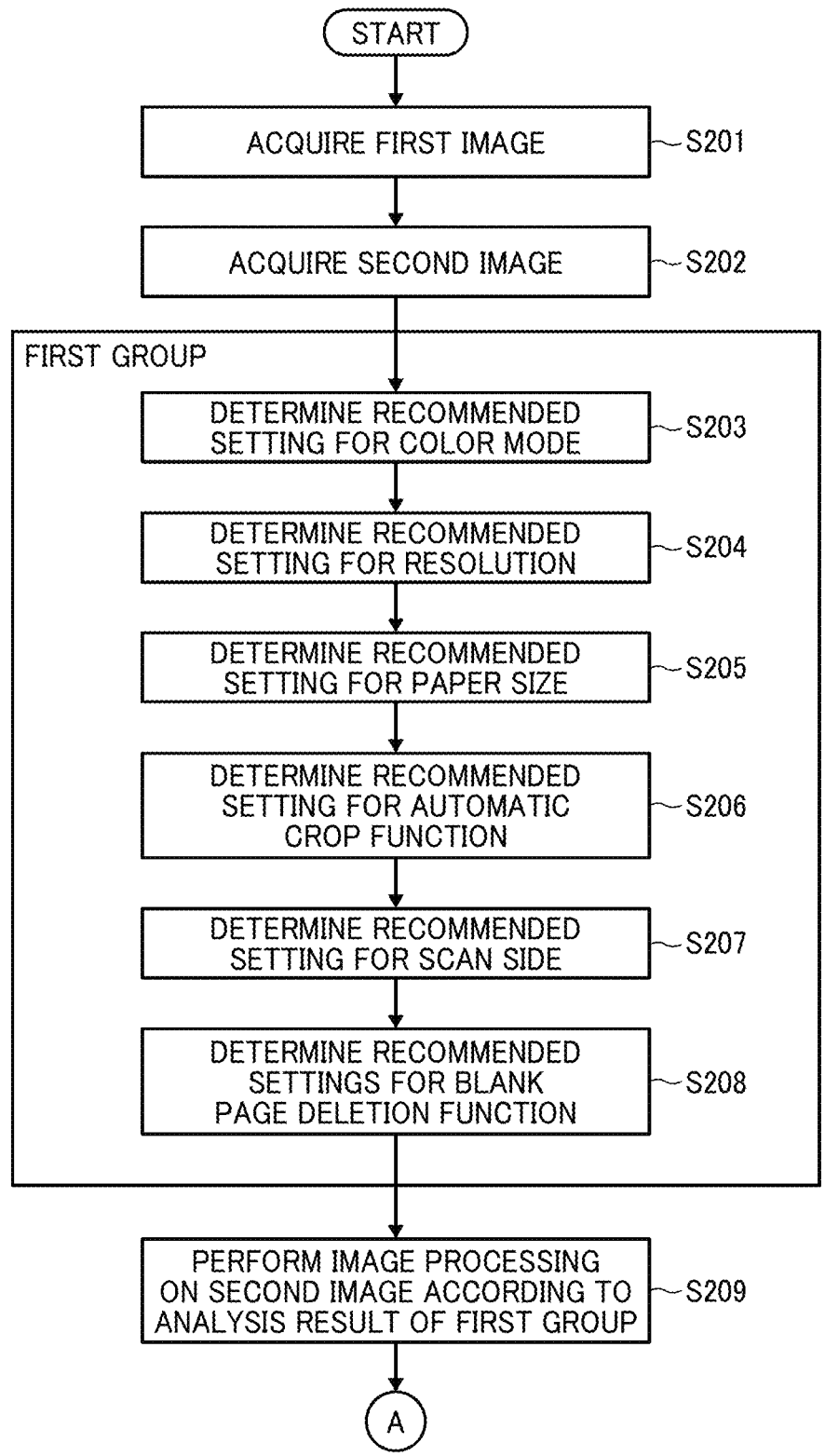
FIG. 11 is a flowchart (1) of an overview of the recommended setting determination process, according to an embodiment of the present disclosure.
Figure 12:
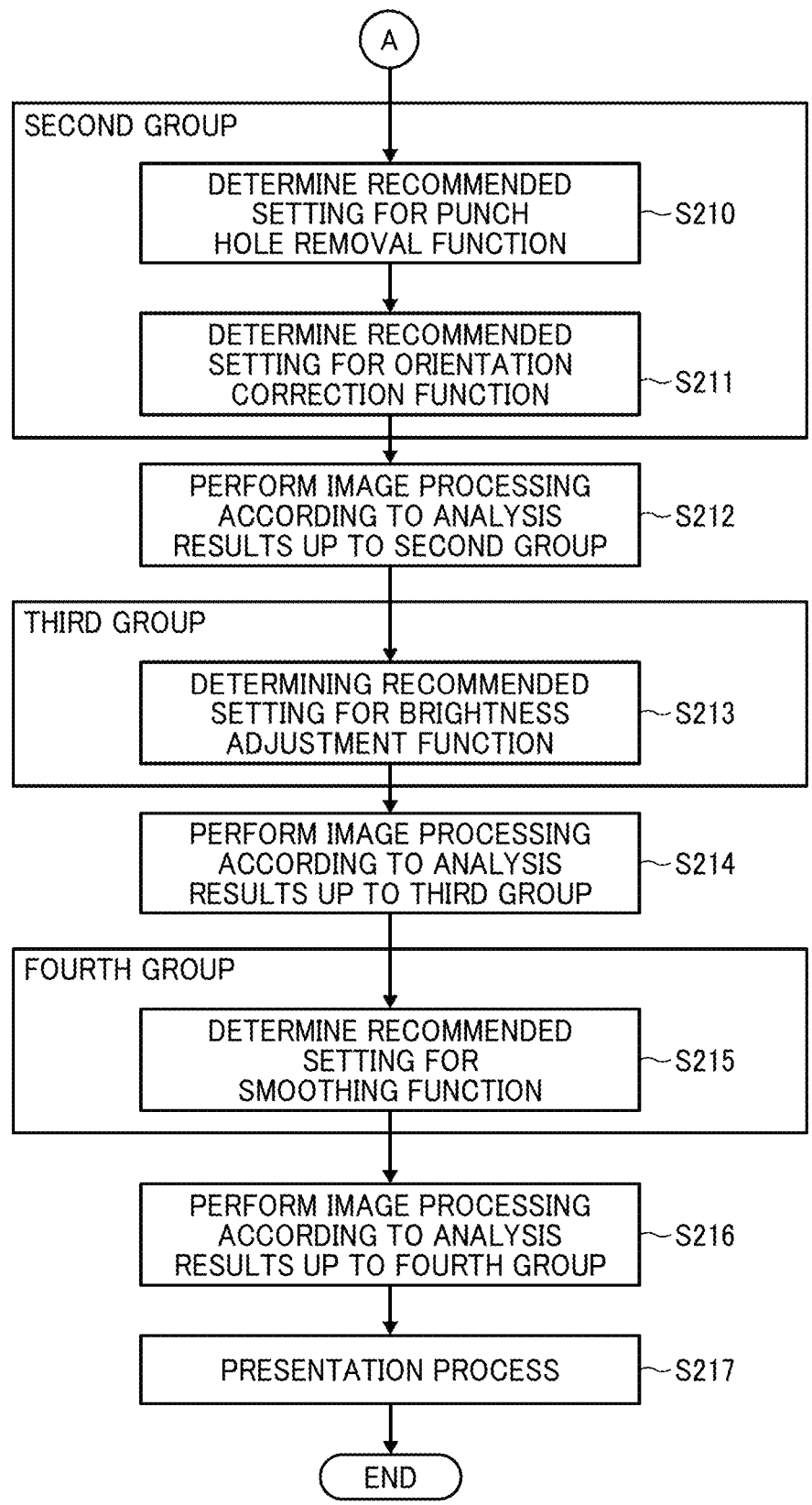
FIG. 12 is a flowchart (2) of an overview of the recommended setting determination process, according to an embodiment of the present disclosure.

FIG. 11 and FIG. 12 are flowcharts of an overview of the recommended setting determination process, according to the present embodiment. The process illustrated in the flowchart is started, for example, in response to receiving a user's instruction to determine a recommended setting at the information processing apparatus 1. In response to receiving the instruction from the user, the presentation unit 35 displays the recommended setting generation screen (see FIG. 6) via the output device 16. The process illustrated in the flowchart may be performed for each of types of an original document (e.g., each of types of work).

In steps S201 and S202, the first image group and the second image group are acquired. The processes in steps S201 and S202 are performed in the same or substantially the same manner as the processes in steps S101 and S102 of FIG. 10, and thus redundant descriptions thereof are omitted. In this flow, a case where a multiple-sheet original document is read by each of the scanners and thus the first image group and the second image group for the multiple-sheet original document are acquired is described for an illustrative purpose. Subsequently, the process proceeds to step S203.

In steps S203 to S208, recommended settings for the setting items belonging to the first group (i.e., the independent group) are determined. The analysis unit 34 determines the recommended settings respectively for the setting items belonging to the first group by performing a comparison analysis between the first image group acquired in step S201 and the second image group acquired in step S202. In the present embodiment, the analysis unit 34 determines the recommended setting for the color mode (step S203), determines the recommended setting for the resolution (step S204), determines the recommended setting for the paper size (step S205), determines the recommended setting for the automatic cropping function (step S206), determines the recommended setting for the scan side (step S207), and determines the recommended setting for the blank page deletion function (step S208).

In the present embodiment, regarding the color mode, the resolution, the paper size, and the automatic cropping function, the recommended settings are determined by performing a comparison analysis between the first image and the second image for each of the multiple sheets (pages). When there is an inconsistency in the determined recommended settings between the sheets (pages), one recommended setting is extracted (selected) by the above-described method. Further, regarding the scan side and the blank page deletion function, the recommended settings are determined by performing a comparison analysis (comparison of the number of images) between the first image group and the second image group for the multiple-page original document. In addition to the above-described setting items, recommended settings for setting items such as the front and back combining function and the vertical split function may be determined. Subsequently, the process proceeds to step S209.

In step S209, image processing is performed on the second image group on the basis of the result of the analysis on the first group (i.e., the recommended settings for the setting items belonging to the first group). The analysis unit 34 executes (performs) image processing corresponding to the recommended settings determined in steps S203 to S208 on the second image group acquired in step S202. Thus, the analysis unit 34 acquires the first processed image group, which is the second image group reflecting the recommended settings for the setting items belonging to the first group. When the recommended settings for the setting items belonging to the first group has already been reflected on the second image group, the image processing in step S209 may be omitted. Subsequently, the process proceeds to step S210.

In steps S210 and S211, recommended settings for the setting items belonging to the second group (i.e., the first dependent group) are determined. The analysis unit 34 determines the recommended settings respectively for the setting items belonging to the second group by performing a comparison analysis between the first image group acquired in step S201 and the first processed image group acquired in step S209. In the present embodiment, the analysis unit 34 determines the recommended setting for the punch hole removal function (step S210) and determines the recommended setting for the orientation correction function (step S211). In the present embodiment, regarding the punch hole removal function and the orientation correction function, the recommended settings are determined by performing a comparison analysis between the first image and the first processed image for each of the multiple sheets (pages). When there is an inconsistency in the determined recommended settings between the sheets (pages), one recommended setting is extracted (selected) by the above-described method. Subsequently, the process proceeds to step S212.

In step S212, image processing is performed on the first processed image group on the basis of the result of the analysis on the second group (i.e., the recommended settings for the setting items belonging to the second group). The analysis unit 34 executes (performs) image processing corresponding to the recommended settings determined in steps S210 and S211 on the first processed image group acquired in step S209. Thus, the analysis unit 34 acquires the second processed image group, which is the first processed image group reflecting the recommended settings for the setting items belonging to the second group. When the recommended settings for the setting items belonging to the second group has already been reflected on the second image group, the image processing in step S212 may be omitted. Subsequently, the process proceeds to step S213.

In step S213, a recommended setting for the setting item belonging to the third group (i.e., the second dependent group) is determined. The analysis unit 34 determines the recommended settings for the setting items belonging to the third group by performing a comparison analysis between the first image group acquired in step S201 and the second processed image group acquired in step S212. In the present embodiment, the analysis unit 34 determines the recommended setting for the brightness adjustment function (including the automatic brightness correction function) (step S213). In the present embodiment, regarding the brightness adjustment function, the recommended setting is determined by performing a comparison analysis between the first image and the second processed image for each of the multiple sheets (pages). When there is an inconsistency in the determined recommended settings between the sheets (pages), one recommended setting is extracted (selected) by the above-described method. Further, regarding the automatic brightness correction function, the recommended setting is determined by performing a comparison analysis (comparison of LUTs between sheets (pages)) between the first image group and the second image group for the multiple-page original document. Subsequently, the process proceeds to step S214.

In step S214, image processing is performed on the second processed image on the basis of the result of the analysis on the third group (i.e., the recommended setting for the setting item belonging to the third group). The analysis unit 34 executes (performs) image processing corresponding to the recommended setting determined in step S213 on the second processed image group acquired in step S212. Thus, the analysis unit 34 acquires the third processed image group, which is the second processed image group reflecting the recommended setting for the setting item belonging to the third group. When the recommended setting for the setting item belonging to the third group has already been reflected on the second image group, the image processing in step S214 may be omitted. Subsequently, the process proceeds to step S215.

In step S215, a recommended setting for the setting item belonging to the fourth group (i.e., the third dependent group) is determined. The analysis unit 34 determines the recommended settings for the setting items belonging to the fourth group by performing a comparison analysis between the first image group acquired in step S201 and the third processed image group acquired in step S214. In the present embodiment, the analysis unit 34 determines the recommended setting for the smoothing function (step S215). In the present embodiment, regarding the smoothing function, the recommended setting is determined by performing a comparison analysis between the first image and the third processed image for each of the multiple sheets (pages). When there is an inconsistency in the determined recommended settings between the sheets (pages), one recommended setting is extracted (selected) by the above-described method. In addition to the above-described setting item, a recommended setting for a setting item relating to color may be determined. Subsequently, the process proceeds to step S216.

In step S216, image processing is performed on the third processed image on the basis of the result of the analysis on the fourth group (i.e., the recommended setting for the setting item belonging to the fourth group). The analysis unit 34 executes (performs) image processing corresponding to the recommended setting determined in step S215 on the third processed image group acquired in step S214. Thus, the analysis unit 34 acquires the fourth processed image group, which is the third processed image group reflecting the recommended setting for the setting item belonging to the fourth group. When the recommended setting for the setting item belonging to the fourth group has already been reflected on the second image group, the image processing in step S216 may be omitted. Subsequently, the process proceeds to step S217.

In step S217, the presenting process is performed. The presentation unit 35 presents the recommended settings (recommended values) for the setting items belonging to the first group to the fourth group and the fourth processed image group, which is the second image group reflecting the recommended settings to a user by displaying the recommended settings and the fourth processed image group on a screen.

Subsequently, the process illustrated in this flowchart ends. In the present embodiment, the description given above for an illustrative purpose is of a case where the recommended settings are determined stepwise with the setting items being classified into the independent group and the dependent group. Alternatively, the recommended settings may be determined stepwise with the setting items being classified into desired groups by a user. Alternatively, the setting items are not necessarily classified into groups. For example, the order in which the recommended settings are to be determined is determined for the setting items, and the recommended settings are determined stepwise according to the determined order. In the present embodiment, the description given for an illustrative purpose is of a case where the recommended settings for all of the setting items belonging a group are first determined, and then image processing for the group is performed. Alternatively, the image processing may be performed upon determination of the recommended setting for each of the setting items.

As described, according to the present embodiment, a comparison analysis is performed between the first image group obtained using the scanner A, which is a scanner to be replaced, and the second image group obtained using the scanner B, which is a scanner as a replacement, for the same original document. On the basis of a result of the comparison analysis, a recommended setting according to which an image group (i.e., third image group) obtained using the scanner B gets closer to the first image group than the second image group is determined. Thus, a setting according to which a user's desired image (an image output result in the scanner B that is equivalent to an image output result relating to the scanner A) is acquired is specified in a simple manner. This allows a user to smoothly perform a replacement without paying attention to settings such as image reading settings and image processing settings relating to an image reading apparatus to be replaced.

Embodiment 2

In Embodiment 1, the information processing apparatus 1 including the driver of the scanner B performs the analysis process (comparison analysis). However, the configuration of the system 9 is not limited to this configuration. For example, an information processing apparatus that does not include the driver of the scanner A and the driver of the scanner B may perform the analysis process. In the present embodiment, an information processing apparatus that does not include the driver of the scanner A and the driver of the scanner B performs the analysis process is described for an illustrative purpose. Examples of such an information processing apparatus include a server.

System Configuration

Figure 13:
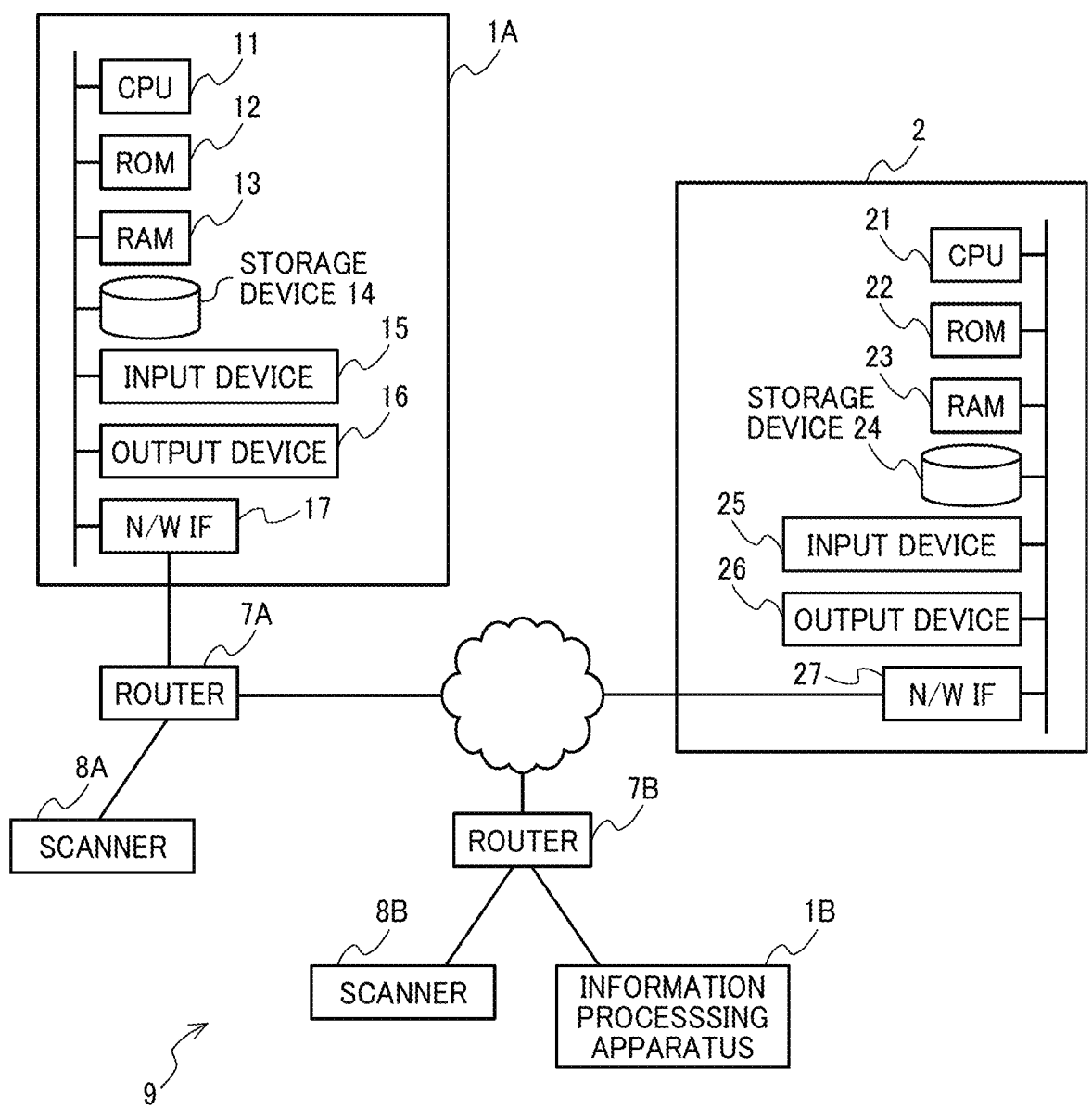
FIG. 13 is a schematic diagram illustrating a configuration of a system, according to Embodiment 2.

FIG. 13 is a schematic diagram illustrating a configuration of the system 9, according to the present embodiment. The system 9 according to the present embodiment includes the scanner A (a scanner 8A), the scanner B (a scanner 8B), an information processing apparatus 1A, an information processing apparatus 1B, and a server 2, which are communicably connected to each other via a network or other communication means. In FIG. 13, the information processing apparatus 1A is connected to the scanner 8A via a router (or gateway) 7A. The information processing apparatus 1B is connected to the scanner 8B via a router (or gateway) 7B. Although FIG. 13 illustrates two information processing apparatuses, the system 9 may include only one information processing apparatus when the scanner A and the scanner B are connected to the same information processing apparatus (when one information processing apparatus includes the first image processor and the second image processor). The configurations of the scanner 8A, the scanner 8B, the information processing apparatus 1A, and the information processing apparatus 1B are substantially the same as those of the scanner 8 and the information processing apparatus 1 in the above-described embodiment, and thus redundant description are omitted. However, in the present embodiment, the information processing apparatus 1A includes the first image processor, and the information processing apparatus 1B includes the second image processor.

The server 2 acquires the first image group acquired by the information processing apparatus 1A and the second image group acquired by the information processing apparatus 1B. The server 2 performs a comparison analysis between the acquired first image group and the acquired second image group, to determine a recommended setting. The server 2 may acquire the first image group and the second image group respectively from the information processing apparatus 1A and the information processing apparatus 1B. Alternatively, the server 2 may acquire the first image group and the second image group from the information processing apparatus 1B (or the information processing apparatus 1A). The server 2 is a computer including a CPU 21, a ROM 22, a RAM 23, a storage device 24, an input device 25, an output device 26, and a communication unit 27. Regarding the specific hardware configuration of the server 2, any component may be omitted, replaced, or added as appropriate according to a mode of implementation. Further, the server 2 is not limited to a single apparatus. The server 2 may be implemented by a plurality of apparatuses using, for example, a so-called cloud or distributed computing technology.

Figure 14:
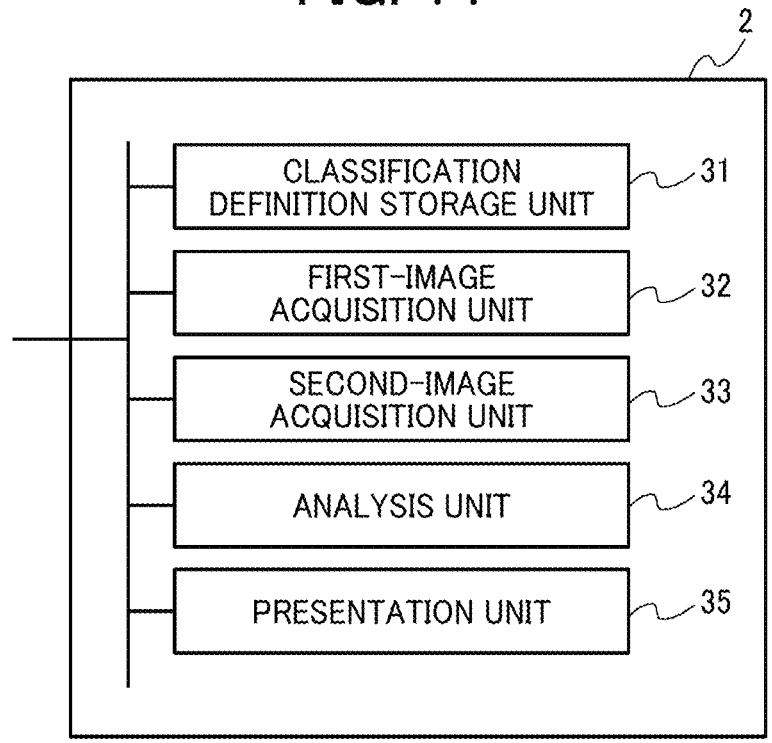
FIG. 14 is a schematic diagram illustrating a functional configuration of a server, according to Embodiment 2.

FIG. 14 is a schematic diagram illustrating a functional configuration of the server 2, according to the present embodiment. The CPU 21 executes a program that is loaded onto the RAM 23 from the storage device 24 and controls the hardware components of the server 2 according to the program. Thus, the server 2 functions as an apparatus including the classification definition storage unit 31, the first-image acquisition unit 32, the second-image acquisition unit 33, the analysis unit 34, and the presentation unit 35. In the present embodiment and other embodiments described below, the functions of the server 2 are executed by the CPU 21, which is a general-purpose processor. Alternatively, a part or all of these functions may be executed by one or a plurality of dedicated processors. The functional configuration (the functional units) of the server 2 is substantially the same as the functional configuration (the functional units) of the information processing apparatus 1 in Embodiment 1, and thus a redundant description thereof is omitted. However, in the present embodiment, the first-image acquisition unit 32 acquires the first image group from the information processing apparatus 1A (the first image processor) through the network, and the second-image acquisition unit 33 acquires the second image group from the information processing apparatus 1B (the second image processor) through, for example, the network. Alternatively, the first-image acquisition unit 32 and the second-image acquisition unit 33 may respectively acquire the first image group and the second image group by reading the first image group and the second image group stored in the storage device 24. Further, in the present embodiment, the presentation unit 35 may present the recommended setting and/or the second image group reflecting the recommended setting (i.e., the fourth processed image group) to a user by transmitting the recommended setting and/or the second image group to the information processing apparatus 1B.

Embodiment 3

Figure 15:
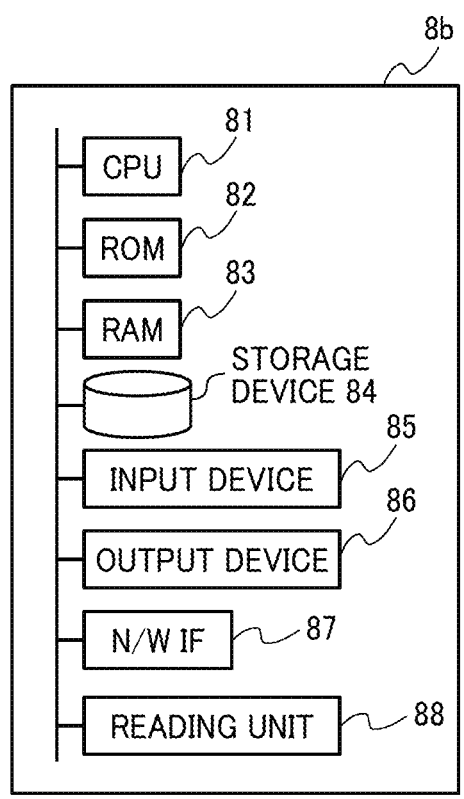
FIG. 15 is a schematic diagram illustrating a configuration of a system, according to Embodiment 3.

In Embodiment 1, the information processing apparatus 1 including the driver of the scanner B performs the analysis process. However, the configuration of the system 9 is not limited to this configuration. For example, the scanner B may perform the analysis process. In the present embodiment, a case where the scanner B performs the analysis process is described for an illustrative purpose.
System Configuration FIG. 15 is a schematic diagram illustrating a configuration of a system, according to the present embodiment. The system according to the present embodiment includes the scanner B (a scanner 8b). The configuration of the scanner 8b is substantially the same as that of Embodiment 1, and thus a redundant description thereof is omitted. The scanner 8b is a computer (information processing apparatus) including a CPU 81, a ROM 82, a RAM 83, a storage device 84, an input device 85, an output device 86, a communication unit 87, and a reading unit 88. The reading unit 88 is a unit to read an original document (original document image) by an image sensor, and serves as the second image reader.

Regarding the specific hardware configuration of the scanner 8b, any component may be omitted, replaced, or added as appropriate according to a mode of implementation.

Figure 16:
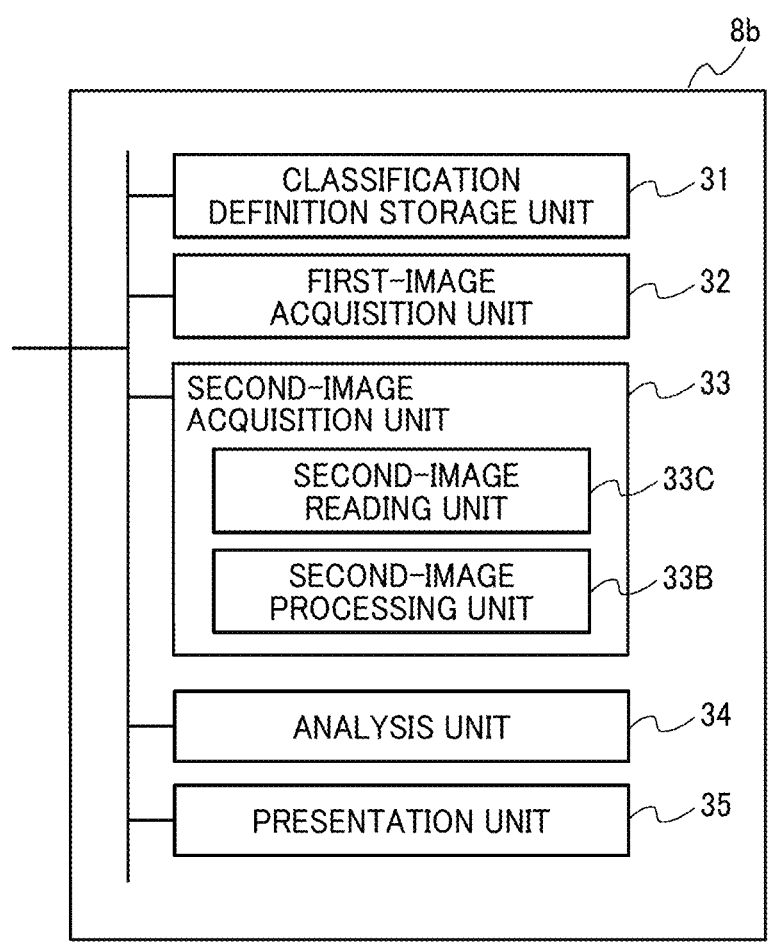
FIG. 16 is a schematic diagram illustrating a functional configuration of a scanner, according to Embodiment 3.

FIG. 16 is a schematic diagram illustrating a functional configuration of the scanner 8b, according to the present embodiment. The CPU 81 executes a program that is loaded onto the RAM 83 from the storage device 84 and controls the hardware components of the scanner 8b according to the program. Thus, the scanner 8b functions as an apparatus including the classification definition storage unit 31, the first-image acquisition unit 32, the second-image acquisition unit 33, the analysis unit 34, and the presentation unit 35. In the present embodiment and other embodiments described below, the functions of the scanner 8b are executed by the CPU 81, which is a general-purpose processor. Alternatively, a part or all of these functions may be executed by one or a plurality of dedicated processors.

The functional configuration (the functional units) of the scanner 8b is substantially the same as the functional configuration (the functional units) of the information processing apparatus 1 in Embodiment 1, and thus a redundant description thereof is omitted. However, in the present embodiment, the second-image acquisition unit 33 includes a second-image reading unit 33C as the second image reader and the second-image processing unit 33B as the second image reader. The second-image reading unit 33C reads a single-sheet original document or multiple-sheet original document (images of the original document) by the imaging sensor. The second-image processing unit 33B performs image processing on one or a plurality of read images generated by reading the single-sheet original document or the multiple-sheet original document by the second-image reading unit 33C. Thus, the second-image acquisition unit 33 acquires the second image group, which is one or a plurality of read images generated by reading the single-sheet original document or the multiple-sheet original document by the second-image reading unit 33C or one or a plurality of images obtained by performing image processing on the one or the plurality of read images by the second-image processing unit 33B. Further, in the present embodiment, the presentation unit 35 may present the recommended setting and/or the second image group reflecting the recommended setting (i.e., the fourth processed image group) to a user by displaying the recommended setting and/or the second image group on, for example, a touch panel of the scanner 8b.

As known in the art, one who uses an image reading apparatus such as a scanner or an image reading system sometimes wants to obtain an output image equivalent to an output image from another image reading apparatus or another image reading system. When a user wants to make an image acquired using an image reading apparatus closer to an image acquired using another image reading apparatus, the user may manually configure various settings. However, in such a case, the user has to estimate (determine) the settings according to which a desired image is acquired.

According to one or more embodiments of the present disclosure, settings according to which a user's desired image is acquired can be determined in a simple manner.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system, comprising circuitry configured to:
   acquire one or a plurality of first images, which are one or a plurality of images obtained by performing image processing by a first image processor on one or a plurality of read images generated by reading a single-sheet original document or a multiple-sheet original document by a first image reading apparatus;
   acquire one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus; and
   determine a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

2. The information processing system of claim 1, wherein the recommended setting includes a plurality of recommended settings, and the circuitry is further configured to:
   determine the plurality of recommended setting respectively for a plurality of setting items in the second image reading apparatus or the second image processor; and
   when determining the recommended setting for a particular setting item of the plurality of setting items that is influenced by a setting content of at least one setting item of the plurality of setting items, determine the recommended setting for the at least one setting item in advance, and perform the comparison analysis between the one or the plurality of first images and the one or the plurality of second images reflecting the determined recommended setting to determine the recommended setting for the particular setting item, so as to determine the plurality of recommended settings for the plurality of setting items stepwise.

3. The information processing system of claim 2, further comprising:
   a memory that stores a classification definition in which the plurality of setting items is classified into N groups from a first group to an N-th group, N being a natural number of 2 or more,
   wherein
   the first group included in the N groups is a group to which one or more setting items of the plurality of setting items belong whose recommended setting or recommended settings are determined without being influenced by the setting content of the at least one setting item,
   an n-th group included in the N groups is a group to which one or more setting items of the plurality of setting items belong whose recommended setting or recommended settings are determined as being influenced by a setting content of a setting item belonging to at least an (n−1)-th group, n being a natural number of 2 or more and N or less, and
   the circuitry is further configured to:
   determine the recommended setting or recommended settings for the one or more setting items belonging to the first group by performing the comparison analysis between the one or the plurality of first images and the one or the plurality of second images; and
   determine the recommended setting or recommended settings for the one or more setting item belonging to the n-th group by performing the comparison analysis between the one or the plurality of first images and the one or the plurality of second images reflecting the recommended setting or recommended settings for one or more setting items belonging to groups up to the (n−1)-th group.

4. The information processing system of claim 3, wherein the first group includes a setting item relating to at least one of a color mode, a resolution, an automatic cropping, a paper size, a scan side, a blank page deletion, a front and back combination, or a vertical split.

5. The information processing system of claim 3, wherein the n-th group includes a setting item relating to at least one of a punch hole removal, an orientation correction, a brightness adjustment, an automatic brightness correction, a smoothing, a background pattern removal, a noise removal, or color.

6. The information processing system of claim 1, wherein the circuitry is further configured to acquire features of the first images and the second images to be compared in the comparison analysis and compare the features between the first images and the second images to determine the recommended setting.

7. The information processing system of claim 6, wherein the features include image sizes, and
   the circuitry is further configured to:
   compare the image sizes between one or more of the first images and one or more of the second images corresponding to a same sheet of the single-sheet original document or the multiple-sheet original document among the first images and the second images to be compared in the comparison analysis; and
   determine the recommended setting for a resolution in the second image reading apparatus or the second image processor based on a result of comparing the image sizes and a setting status for the resolution in the second image reading apparatus or the second image processor.

8. The information processing system of claim 7, wherein the circuitry is further configured to determine the recommended setting for a paper size based on an image size of each of the one or the plurality of first images and the determined recommended setting for the resolution.

9. The information processing system of claim 6, wherein
the features include degrees of variation in pixel values in a particular area in an image, and
the circuitry is further configured to compare the degrees of variation between one or more of the first images and one or more of the second images corresponding to a same sheet of the single-sheet original document or the multiple-sheet original document among the first images and the second images to be compared in the comparison analysis to determine the recommended setting for a smoothing function.

10. The information processing system of claim 6, wherein
the features include brightness histograms, and
the circuitry is further configured to compare the brightness histograms between one or more of the first images and one or more of the second images corresponding to a same sheet of the single-sheet original document or the multiple-sheet original document among the first images and the second images to be compared in the comparison analysis to determine the recommended setting for a brightness adjustment.

11. The information processing system of claim 6, wherein
the features include numbers of images and aspect ratios, and
the circuitry is further configured to compare the numbers of images and the aspect ratios between one or more of the first images and one or more of the second images corresponding to the multiple-sheet original document in the comparison analysis to determine the recommended setting for at least one of a front and back combining function or a vertical split function.

12. The information processing system of claim 6, wherein
the features include brightness histograms, and
the circuitry is further configured to compare brightness correspondences between one or more of the first images and one or more of the second images corresponding to a same sheet of multiple sheets of the multiple-sheet original document among the first images and the second images to be compared in the comparison analysis, the brightness correspondence being obtained by comparing the brightness histograms between the images corresponding to the same sheet to determine the recommended setting for an automatic brightness correction function.

13. The information processing system of claim 6, wherein
the features include numbers of images, and
the circuitry is further configured to compare the numbers of images between the first images and the second images corresponding to the multiple-sheet original document to be compared in the comparison analysis, to determine the recommended setting for at least one of a scan side or a blank page deletion function.

14. The information processing system of claim 1, wherein the circuitry is further configured to perform processing of setting a setting item one or more times, with a setting value of the setting item being changed from one to another, the processing of setting being performed on at least one of the first images and the second images corresponding to a same sheet of the single-sheet original document or the multiple-sheet original document among images to be compared in the comparison analysis to determine the recommended setting for the setting item according to a degree of similarity between the first images and the second images corresponding to the same sheet, after the processing is performed on the at least one of the first images and the second images.

15. The information processing system of claim 1, wherein the circuitry is further configured to present the determined recommended setting to a user.

16. The information processing system of claim 15, wherein the circuitry is further configured to present, to the user, one or a plurality of images obtained by performing processing based on the determined recommended setting on the one or the plurality of second images.

17. A method comprising:
acquiring one or a plurality of first images, which are one or a plurality of images obtained by performing image processing by a first image processor on one or a plurality of read images generated by reading a single-sheet original document or a multiple-sheet original document by a first image reading apparatus;
acquiring one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus; and
determining a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

18. A non-transitory computer-executable medium storing a plurality of instructions which, when executed by a processor, causes the processor to perform a method comprising:
acquiring one or a plurality of first images, which are one or a plurality of images obtained by performing image processing by a first image processor on one or a plurality of read images generated by reading a single-sheet original document or a multiple-sheet original document by a first image reading apparatus;
acquiring one or a plurality of second images, which are one or a plurality of read images generated by reading the single-sheet original document or the multiple-sheet original document by a second image reading apparatus or one or a plurality of images obtained by performing image processing by a second image processor on the one or the plurality read images generated by reading the single-sheet original document or the multiple-sheet original document by the second image reading apparatus; and determining a recommended setting by performing a comparison analysis using the one or the plurality of first images and the one or the plurality of second images, the recommended setting being a setting different from a setting used in obtaining the one or the plurality of second images by the second image reading apparatus or the second image processor, and the recommended setting being a setting causing one or a plurality of third images to be closer to the one or the plurality of first images than the one or the plurality of second images, the one or the plurality of third images being obtained from the single-sheet original document or the multiple-sheet original document by the second image reading apparatus and by the second image processor to which the recommended setting is applied.

* * * * *